United States Patent
Kim

(10) Patent No.: US 12,082,041 B2
(45) Date of Patent: Sep. 3, 2024

(54) METHOD AND COMMUNICATION DEVICE FOR TRANSMITTING OR RECEIVING DATA BY USING AVAILABLE BUFFER SIZE

(71) Applicant: LG ELECTRONICS INC., Seoul (KR)

(72) Inventor: Cheolseung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 342 days.

(21) Appl. No.: 17/754,092

(22) PCT Filed: Sep. 26, 2019

(86) PCT No.: PCT/KR2019/012506
§ 371 (c)(1),
(2) Date: Mar. 23, 2022

(87) PCT Pub. No.: WO2021/060580
PCT Pub. Date: Apr. 1, 2021

(65) Prior Publication Data
US 2022/0345934 A1     Oct. 27, 2022

(51) Int. Cl.
*H04W 4/40*      (2018.01)
*H04W 28/02*     (2009.01)

(52) U.S. Cl.
CPC ......... *H04W 28/0278* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 2004/0204108 A1* | 10/2004 | Etkin | H04W 16/28 455/562.1 |
| 2017/0201902 A1 | 7/2017 | Chen et al. | |
| 2019/0200336 A1 | 6/2019 | Janse van Rensburg et al. | |
| 2020/0413394 A1* | 12/2020 | Yan | H04W 72/046 |
| 2021/0058131 A1* | 2/2021 | Zhu | H04B 7/063 |

FOREIGN PATENT DOCUMENTS

KR    10-2018-0070260    6/2018

OTHER PUBLICATIONS

PCT International Application No. PCT/KR2019/012506, International Search Report dated Jun. 24, 2020, 4 pages.

(Continued)

*Primary Examiner* — Robert M Morlan
(74) *Attorney, Agent, or Firm* — LEE, HONG, DEGERMAN, KANG & WAIMEY

(57) ABSTRACT

A disclosure of the present specification provides a server for controlling a TCU mounted in a vehicle in a next generation mobile communication system. The server may comprise a transceiver and a processor, wherein the processor configured to perform: determining an available data rate for a combination of a plurality of transmission beams of a base station and a plurality of reception beams of the TCU; receiving, from the TCU, information on an available buffer size of the TCU and information on a downlink service requirement of one or more electronic devices in the vehicle; determining a data rate of downlink data and a first transmission beam of the base station.

13 Claims, 21 Drawing Sheets

(56) References Cited

OTHER PUBLICATIONS

Chang et al., "Analyzing MEC Architectural Implications for LTE/LTE-A," Eurecom, Research Report RR-16-312, Feb. 2016, 30 pages.
Elbamby et al., "Wireless Edge Computing with Latency and Reliability Guarantees," arXiv: 1905.05316v1, May 2019, 22 pages.

* cited by examiner

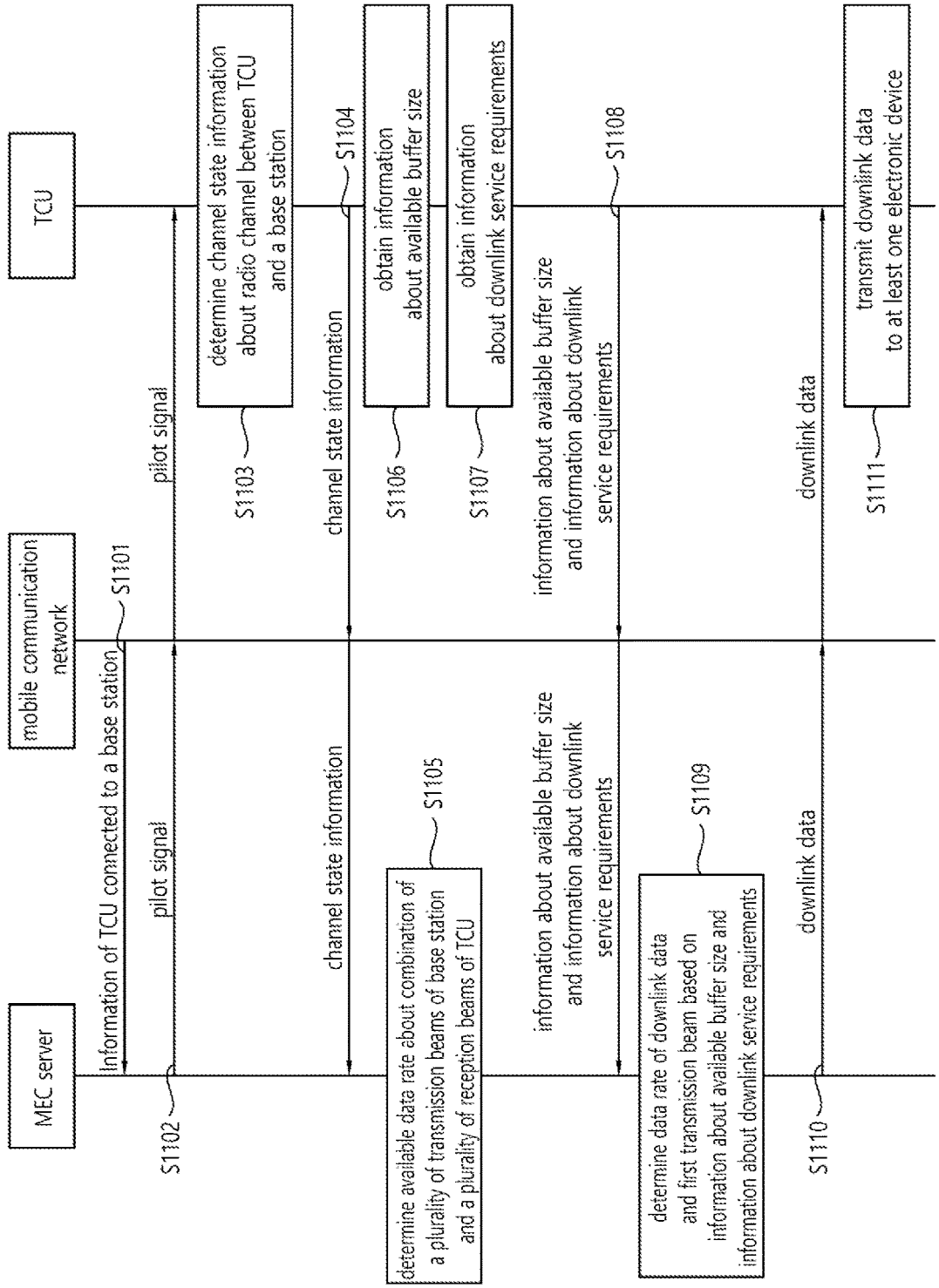

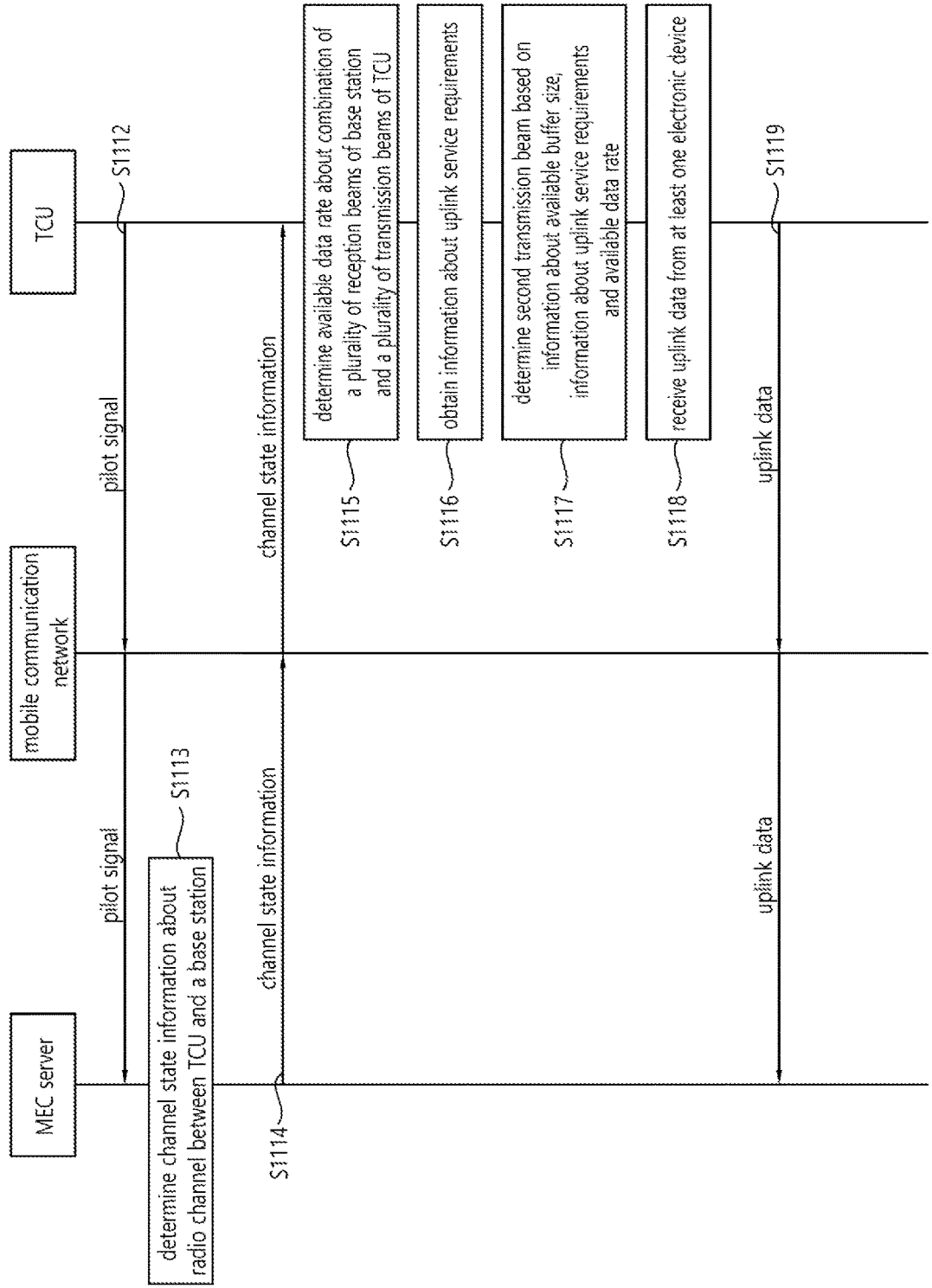

METHOD AND COMMUNICATION DEVICE FOR TRANSMITTING OR RECEIVING DATA BY USING AVAILABLE BUFFER SIZE

CROSS-REFERENCE TO RELATED APPLICATIONS

This application is the National Stage filing under 35 U.S.C. 371 of International Application No. PCT/KR2019/012506, filed on Sep. 26, 2019, the contents of which is hereby incorporated by reference herein in its entirety.

TECHNICAL FIELD

The present disclosure generally relates to next generation mobile communication.

BACKGROUND

Thanks to the success of Evolved Universal Terrestrial Radio Access Network (E-UTRAN), that is, long term evolution (LTE)/LTE-Advanced (LTE-A) for 4G mobile communication, interest in next-generation, that is, 5G (so-called 5G) mobile communication is increasing, and research is being conducted one after another.

For the fifth generation (so-called 5G) mobile communication, a new radio access technology (New RAT or NR) has been studied. In particular, automotive driving is expected to become an important new driving force for 5G with various use cases of mobile communication for vehicles.

In the case of autonomous driving, where the server remotely controls the vehicle, it should take less than 5 msec, until the vehicle transmits data to the server, the vehicle receives control data from this server and the vehicle operates.

However, in the conventional cloud server-based network structure (eg, base station-wired network-cloud server), there is a problem that it takes about 30-40 msec for operations that the base station transmits the data received from the vehicle to the cloud server, the cloud server analyzes the data in the cloud server, the cloud server transmits the data to the base station, and the base station receives the data.

In order to improve the conventional network structure and achieve URLLC, ETSI (European Telecommunications Standards Institute) and 5GAA are discussing about Multi-access Edge Computing (MEC). However, there has not been a method in which data transmission/reception between the MEC server and the TCU mounted on the vehicle can be performed quickly and efficiently.

While receiving high-capacity streaming data (eg 8k video, 8k AR/VR, etc.), the TCU could not effectively transmit camera data and sensor data (radar sensor data, lidar sensor data) to be used for vehicle remote control at the same time. Here, the data rate of the camera data may be 12 Gbps or more, and the data rates of the radar sensor data and the lidar sensor data may be 10 Gbps or more, respectively.

In addition, in order for the MEC server to remotely control the vehicle, the TCU needs to transmit as much camera data and sensor data as possible to the MEC server. However, in the prior art, there is a problem that sufficient time resources are not allocated for uplink transmission from the TCU to the MEC server.

SUMMARY

Accordingly, a disclosure of the present specification has been made in an effort to solve the aforementioned problem.

In order to achieve the above object, one disclosure of the present specification provides a server for controlling a Telematics Communication Unit (TCU) mounted on a vehicle in a next-generation mobile communication system. The server may include a transceiver; and a processor for controlling the transceiver, wherein the processor is configured to perform: determining available data rate for a combination of a plurality of transmit beams of the base station and a plurality of receive beams of the TCU based on channel state information on a radio channel between the TCU and the base station; receiving information on the available buffer size of the TCU and information on downlink service requirements of one or more electronic devices in the vehicle from the TCU through the base station; determining a data rate of downlink data and a first transmission beam of the base station based on information on the available buffer size of the TCU, information on downlink service requirements for the one or more devices, and the available data rate; and transmitting the downlink data to the TCU through the base station based on the determined data rate and the first transmission beam.

The information on the available buffer size of the TCU may include information on the available buffer size of the memory of the TCU and information on the available buffer size of at least one transceiver of the TCU.

The information on the available buffer size of the TCU used in the process of determining the data rate and the first transmission beam is the smaller buffer size between the available buffer size of the memory of the TCU and the available buffer size of the at least one transceiver of the TCU.

The information on the downlink service requirement may include information on a data rate requirement and information on a delay requirement.

The data rate of the downlink data may be determined as a value obtained by multiplying N by the first data rate required in the information on the downlink service requirement.

The N may be a maximum value among N values satisfying the inequality of the N*the first data rate<the available buffer size of the TCU.

The processor may further perform a process of receiving the channel state information from the TCU through the base station.

The base station may include a long term evolution (LTE) transceiver, a 5G transceiver, and a WiFi transceiver.

In order to achieve the above object, one disclosure of the present specification provides a TCU (Telematics Communication Unit) mounted on a vehicle, comprising: a memory; at least one transceiver; and a processor for controlling the memory and the at least one transceiver, wherein the processor is configured to perform: determining available data rate for a combination of a plurality of reception beams of the base station and each of plurality of transmission beam of the at least one transceiver based on channel state information for a radio channel between the TCU and the base station; determining a first transmission beam of the at least one transceiver based on the information on the available buffer size of the TCU, information on uplink service requirements of one or more electronic devices in the vehicle, and the available data rate; and after receiving uplink data from the one or more electronic devices, transmitting the uplink data to the server through the base station based on the first transmission beam.

The processor may further perform a process of transmitting information on the available buffer size of the TCU and information on downlink service requirements of the one or more electronic devices to the server through the base station.

The processor may further configured to perform: receiving downlink data from the server through the base station; and transmitting the received downlink data to the one or more electronic devices.

The information on the available buffer size of the TCU may include information on the available buffer size of the memory and information on the available buffer size of the at least one transceiver.

The information on the uplink service requirement may include information on a data rate requirement and information on a delay requirement.

The one or more electronic devices include a first electronic device and a second electronic device, and the uplink data includes first uplink data of the first electronic device and second uplink data of the second electronic device, the processor may further perform a process of determining priorities of the first uplink data and the second uplink data based on the information on the delay requirement condition.

The first transmission beam for each of the first uplink data and the second uplink data may be determined in the order of the determined priority.

The processor may further perform a process of receiving the channel state information from the base station.

The at least one transceiver may include a long term evolution (LTE) transceiver, a 5G transceiver, and a WiFi transceiver.

According to the disclosure of the present specification, the existing problems are solved.

BRIEF DESCRIPTION OF THE DRAWINGS

FIGS. 11a and 11b are signal flow diagrams illustrating examples of operations of a TCU, an MEC server, and a mobile communication network according to the disclosure of the present specification.

FIG. 12 is a flowchart illustrating an example of S1109 of FIG. 11a.

DESCRIPTION OF EXEMPLARY EMBODIMENTS

Figure 1:
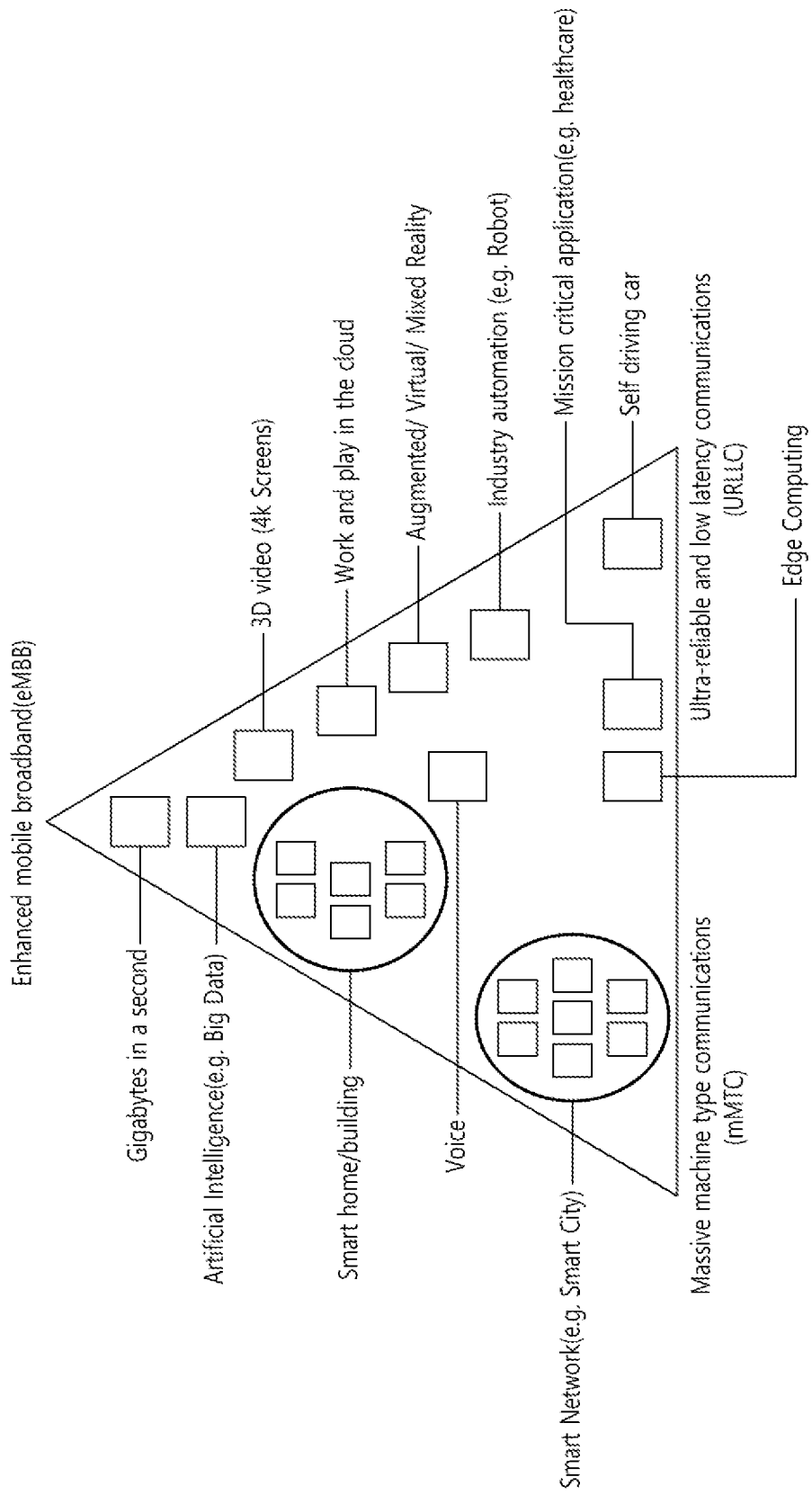
FIG. 1 shows an example of a 5G usage scenario.

Hereinafter, it is described that the present disclosure is applied based on 3rd Generation Partnership Project (3GPP) 3GPP long term evolution (LTE), 3GPP LTE-A (LTE-Advanced), Wi-Fi or 3GPP NR (New RAT, that is, 5G) do. This is merely an example, and the present disclosure can be applied to various wireless communication systems. Hereinafter, LTE includes LTE and/or LTE-A.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

And, hereinafter, the term UE (User Equipment) used may be fixed or mobile, and may include a device, a wireless device, a wireless communication device, a terminal, and an MS (mobile station), UT (user terminal), SS (subscriber station), MT (mobile terminal), etc may be called as other terms.

FIG. 1 shows an example of a 5G usage scenario.

FIG. 1 shows an example of a 5G usage scenario to which the technical features of the present disclosure can be applied. The 5G usage scenario shown in FIG. 1 is merely exemplary, and the technical features of the present disclosure can be applied to other 5G usage scenarios not shown in FIG. 1.

Referring to FIG. 1, the three main requirements areas of 5G are (1) enhanced mobile broadband (eMBB) domain, (2) massive machine type communication (mMTC) area domain and (3) includes ultra-reliable and low latency communications (URLLC) domains. Some use cases may require multiple domains for optimization, while other use cases may focus on only one key performance indicator (KPI). 5G supports these various use cases in a flexible and reliable way.

eMBB focuses on overall improvements in data rates, latency, user density, capacity and coverage of mobile broadband connections. eMBB aims for a throughput of around 10 Gbps. eMBB goes far beyond basic mobile Internet access, covering rich interactive work, media and entertainment applications in the cloud or augmented reality. Data is one of the key drivers of 5G, and for the first time in the 5G era, we may not see dedicated voice services. In 5G, voice is simply expected to be processed as an application using the data connection provided by the communication system. The main reasons for the increased amount of traffic are the increase in content size and the increase in the number of applications requiring high data rates. Streaming services (audio and video), interactive video and mobile Internet connections will become more widely used as more devices connect to the Internet. Many of these applications require always-on connectivity to push real-time information and notifications to users. Cloud storage and applications are growing rapidly in mobile communication platforms, which can be applied to both work and entertainment. Cloud storage is a special use case that drives the growth of uplink data rates. 5G is also used for remote work in the cloud, requiring much lower end-to-end latency to maintain a good user experience when tactile interfaces are used. In entertainment, for example, cloud gaming and video streaming are another key factor increasing the demand for mobile broadband capabilities. Entertainment is essential on smartphones and tablets anywhere, including in high-mobility environments such as trains, cars and airplanes. Another use example is augmented reality for entertainment and information retrieval. Here, augmented reality requires very low latency and instantaneous amount of data.

mMTC is designed to enable communication between a large number of low-cost devices powered by batteries and is intended to support applications such as smart metering, logistics, field and body sensors. mMTC is targeting a battery life of 10 years or so and/or a million devices per square kilometer. mMTC enables seamless connectivity of embedded sensors in all fields and is one of the most anticipated 5G use cases. Potentially, by 2020, there will be 20.4 billion IoT devices. Industrial IoT is one of the areas where 5G will play a major role in enabling smart cities, asset tracking, smart utilities, agriculture and security infrastructure.

URLLC is ideal for vehicular communications, industrial control, factory automation, telesurgery, smart grid, and public safety applications by allowing devices and machines to communicate very reliably, with very low latency and with high availability. URLLC aims for a delay on the order of 1 ms. URLLC includes new services that will transform the industry through ultra-reliable/low-latency links such as remote control of critical infrastructure and autonomous vehicles. This level of reliability and latency is essential for smart grid control, industrial automation, robotics, and drone control and coordination.

Next, a plurality of usage examples included in the triangle of FIG. 1 will be described in more detail.

5G could complement fiber-to-the-home (FTTH) and cable-based broadband (or DOCSIS) as a means of delivering streams rated at hundreds of megabits per second to gigabits per second. Such high speed may be required to deliver TVs with resolutions of 4K or higher (6K, 8K and higher) as well as virtual reality (VR) and augmented reality (AR). VR and AR applications almost include immersive sports events. Certain applications may require special network settings. For VR games, for example, game companies may need to integrate core servers with network operators' edge network servers to minimize latency.

Smart cities and smart homes, referred to as smart societies, will be embedded with high-density wireless sensor networks. A distributed network of intelligent sensors will identify conditions for keeping a city or house cost- and energy-efficient. A similar setup can be performed for each household. Temperature sensors, window and heating controllers, burglar alarms and appliances are all connected wirelessly. Many of these sensors typically require low data rates, low power and low cost. However, for example, real-time HD video may be required in certain types of devices for surveillance.

The consumption and distribution of energy, including heat or gas, is highly decentralized, requiring automated control of distributed sensor networks. Smart grids use digital information and communication technologies to interconnect these sensors to collect information and act on it. This information can include supplier and consumer behavior, enabling smart grids to improve efficiency, reliability, economics, sustainability of production and distribution of fuels such as electricity in an automated manner. The smart grid can also be viewed as another low-latency sensor network.

The health sector has many applications that can benefit from mobile communications. The communication system may support telemedicine providing clinical care from a remote location. This can help reduce barriers to distance and improve access to consistently unavailable health care services in remote rural areas. It is also used to save lives in critical care and emergency situations. A wireless sensor network based on mobile communication may provide remote monitoring and sensors for parameters such as heart rate and blood pressure.

Wireless and mobile communications are becoming increasingly important in industrial applications. Wiring is expensive to install and maintain. Thus, the possibility of replacing cables with reconfigurable radio links is an attractive opportunity for many industries. Achieving this, however, requires that wireless connections operate with cable-like delays, reliability and capacity, and that their management is simplified. Low latency and very low error probability are new requirements that need to be connected with 5G.

Logistics and freight tracking are important use cases for mobile communications that use location-based information systems to enable tracking of inventory and packages from anywhere. Logistics and freight tracking use cases typically require low data rates but require wide range and reliable location information.

In particular, automotive is expected to become an important new driving force for 5G with many use cases for mobile communication to vehicles. For example, entertainment for passengers requires both high capacity and high mobile broadband. The reason is that future users continue to expect high-quality connections regardless of their location and speed. Another example of use in the automotive sector is augmented reality dashboards. The augmented reality contrast board allows drivers to identify objects in the dark above what they are seeing through the front window. The augmented reality dashboard displays information to inform the driver about the distance and movement of objects by superimposing the information on the front window. In the future, wireless modules will enable communication between vehicles, information exchange between vehicles and supporting infrastructure, and information exchange between vehicles and other connected devices (eg, devices carried by pedestrians). Safety systems can lower the risk of accidents by guiding drivers through alternative courses of action to help them drive safer. The next step will be remote-controlled vehicles or autonomous vehicles. This requires very reliable and very fast communication between different autonomous vehicles and/or between vehicles and infrastructure. In the future, autonomous vehicles will perform all driving activities, allowing drivers to focus only on traffic anomalies that the vehicle itself cannot identify. The technological requirements of autonomous vehicles require ultra-low latency and ultra-fast reliability to increase traffic safety to unattainable levels for humans.

Figure 2:
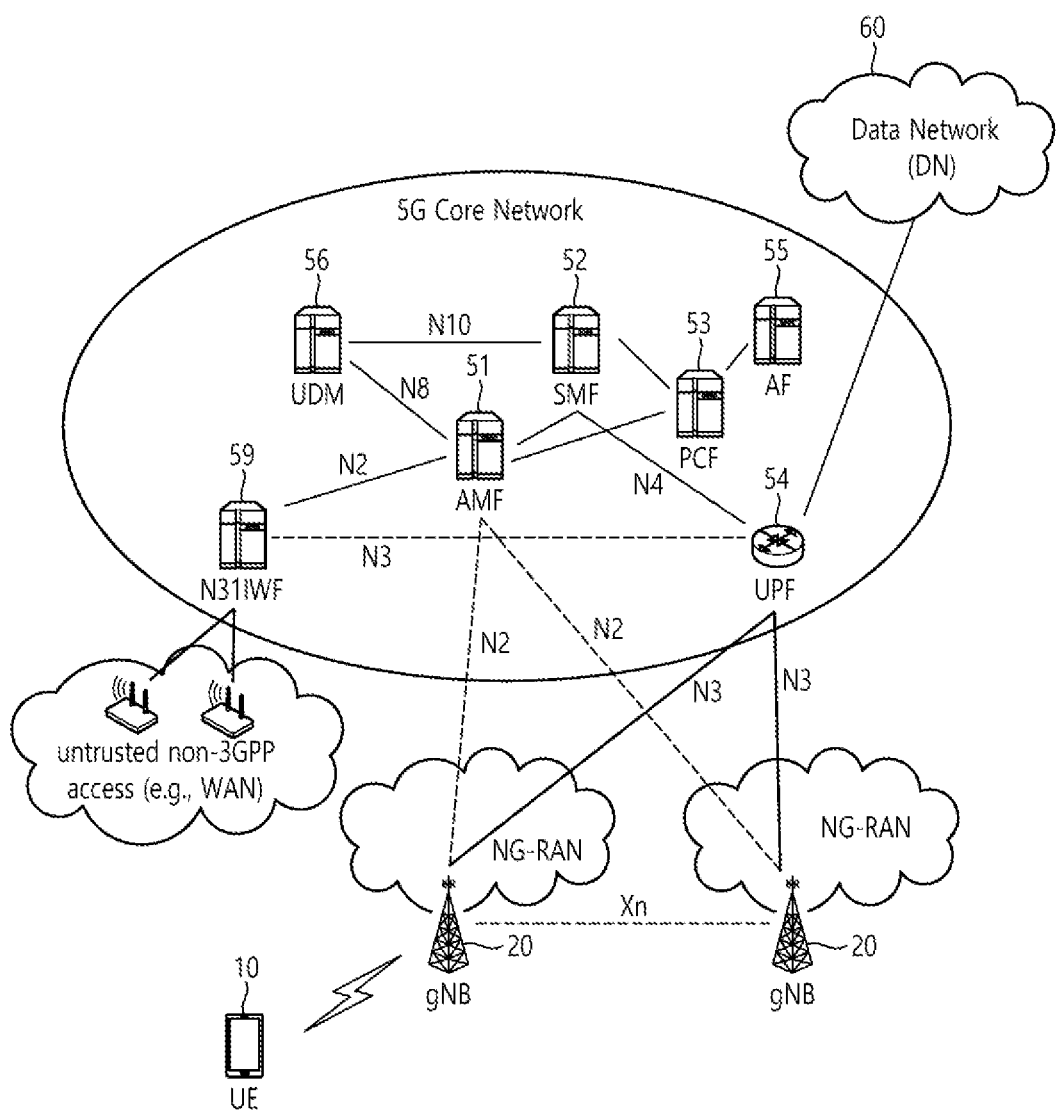
FIG. 2 is a structural diagram of a next-generation mobile communication network.

FIG. 2 is a structural diagram of a next-generation mobile communication network.

A next-generation mobile communication network (5G System) may include various components, and in FIG. 2, AMF (Access and Mobility Management Function) 51 and SMF (session management function), Session Management Function (52), PCF (Policy Control Function) (53), AF (Application Function: Application Function) (55), N3IWF (Non-3GPP Interworking Function: Non-3GPP Interworking Function) 59, a UPF (User Plane Function) 54, a UDM (Unified Data Management), and data network 56 corresponding to some of the various components are shown.

The UE 10 is connected to the data network 60 via the UPF 55 through a Next Generation Radio Access Network (NG-RAN) including the gNB 20.

The UE 10 may be provided with a data service even through untrusted non-3GPP access, e.g., a wireless local area network (WLAN). In order to connect the non-3GPP access to a core network, the N3IWF 59 may be deployed.

The illustrated N3IWF performs a function of managing interworking between the non-3GPP access and the 5G system. When the UE 10 is connected to non-3GPP access (e.g., WiFi referred to as IEEE 801.11), the UE 10 may be connected to the 5G system through the N3IWF. The N3IWF performs control signaling with the AMF and is connected to the UPF through an N3 interface for data transmission.

The illustrated AMF may manage access and mobility in the 5G system. The AMF may perform a function of managing Non-Access Stratum (NAS) security. The AMF may perform a function of handling mobility in an idle state.

The illustrated UPF is a type of gateway through which user data is transmitted/received. The UPF may perform the entirety or a portion of a user plane function of a serving gateway (S-GW) and a packet data network gateway (P-GW) of 4G mobile communication.

The UPF operates as a boundary point between a next generation radio access network (NG-RAN) and the core network and maintains a data path between the gNB 20 and the SMF. In addition, when the UE 10 moves over an area served by the gNB 20, the UPF serves as a mobility anchor point. The UPF may perform a function of handling a PDU. For mobility within the NG-RAN (which is defined after 3GPP Release-15), the UPF may route packets. In addition, the UPF may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF may correspond to a termination point of a data interface toward the data network.

The illustrated PCF is a node that controls an operator's policy.

The illustrated AF is a server for providing various services to the UE 10.

The illustrated UDM is a kind of server that manages subscriber information, such as home subscriber server (HSS) of 4G mobile communication. The UDM stores and manages the subscriber information in a unified data repository (UDR).

The illustrated SMF may perform a function of allocating an Internet protocol (IP) address of the UE. In addition, the SMF may control a protocol data unit (PDU) session.

Figure 3:
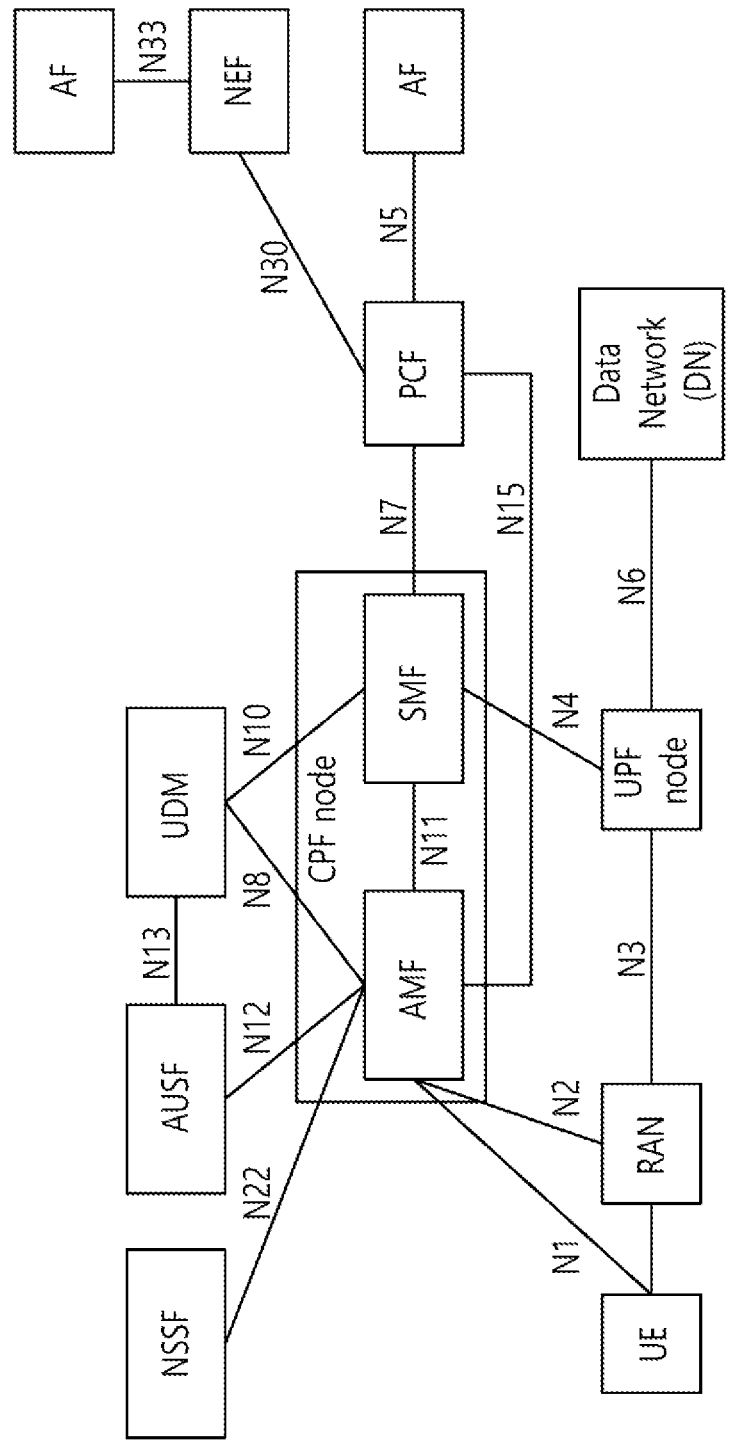
FIG. 3 is an exemplary diagram illustrating an expected structure of a next-generation mobile communication network from the viewpoint of a node.

FIG. 3 is an exemplary diagram illustrating an expected structure of a next-generation mobile communication network from the viewpoint of a node.

As can be seen with reference to FIG. 3, the UE is connected to a data network (DN) through a next-generation RAN (Radio Access Network).

The illustrated control plane function (CPF) node performs all or part of the functions of the Mobility Management Entity (MME) of the 4th generation mobile communication, and all or part of the control plane functions of the Serving Gateway (S-GW) and all or part of the control plane functions of the PDN Gateway (P-GW). The CPF node includes an AMF and an SMF.

The illustrated Authentication Server Function (AUSF) authenticates and manages the UE.

The illustrated network slice selection function (Network Slice Selection Function: NSSF) is a node for network slicing introduced in 5G.

The illustrated Network Exposure Function (NEF) is a node for providing a mechanism for securely exposing the services and functions of the 5G core. For example, NEF may expose functions and events, securely provide information from external applications to the 3GPP network, translate internal/external information, provides control plane parameters, and manage packet flow description (PFD).

Figure 4:
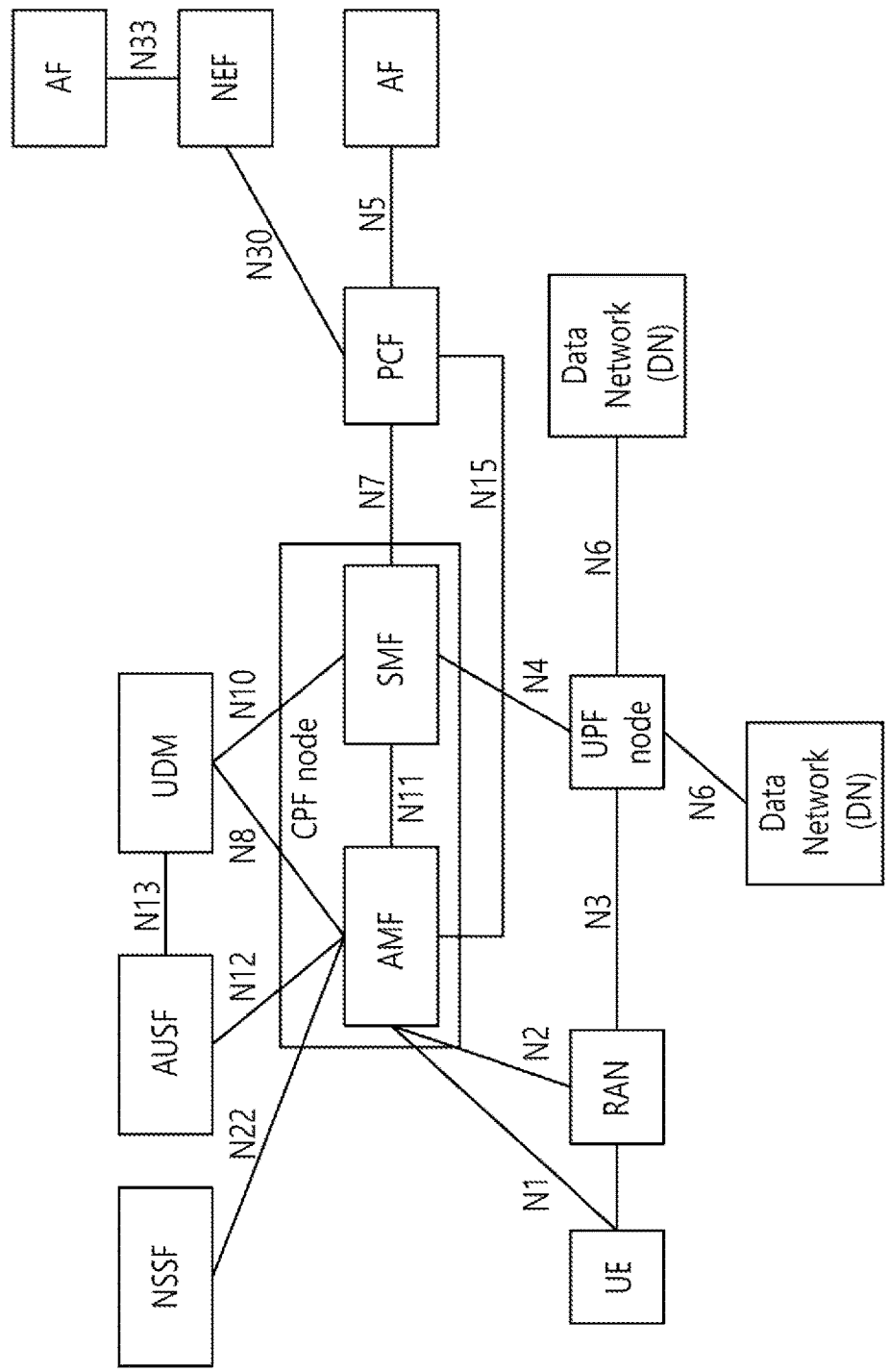
FIG. 4 is an exemplary diagram illustrating an architecture for supporting simultaneous access to two data networks.

In FIG. 4, a UE may simultaneously access two data networks using multiple protocol data unit (PDU) sessions.

FIG. 4 is an exemplary diagram illustrating an architecture for supporting simultaneous access to two data networks.

FIG. 4 shows an architecture for a UE to simultaneously access two data networks using one PDU session.

For reference, a description of the reference point shown in FIGS. 2 to 4 is as follows.

N1: Reference point between UE and AMF
N2: Reference point between NG-RAN and AMF
N3: Reference point between NG-RAN and UPF
N4: Reference point between SMF and UPF
N5: Reference point between PCF and AF
N6: Reference point between UPF and DN
N7: Reference point between SMF and PCF
N8: Reference point between UDM and AMF
N10: Reference point between UDM and SMF
N11: Reference point between AMF and SMF
N12: Reference point between AMF and AUSF
N13: Reference point between UDM and AUSF
N15: In a non-roaming scenario, a reference point between the PCF and the AMF. In a roaming scenario, the reference point between the AMF and the PCF of the visited network
N22: Reference point between AMF and NSSF
N30: Reference point between PCF and NEF
N33: Reference point between AF and NEF In FIGS. 3 and 4, the AF by a third party other than the operator may be connected to the 5GC through the NEF.

Figure 5:
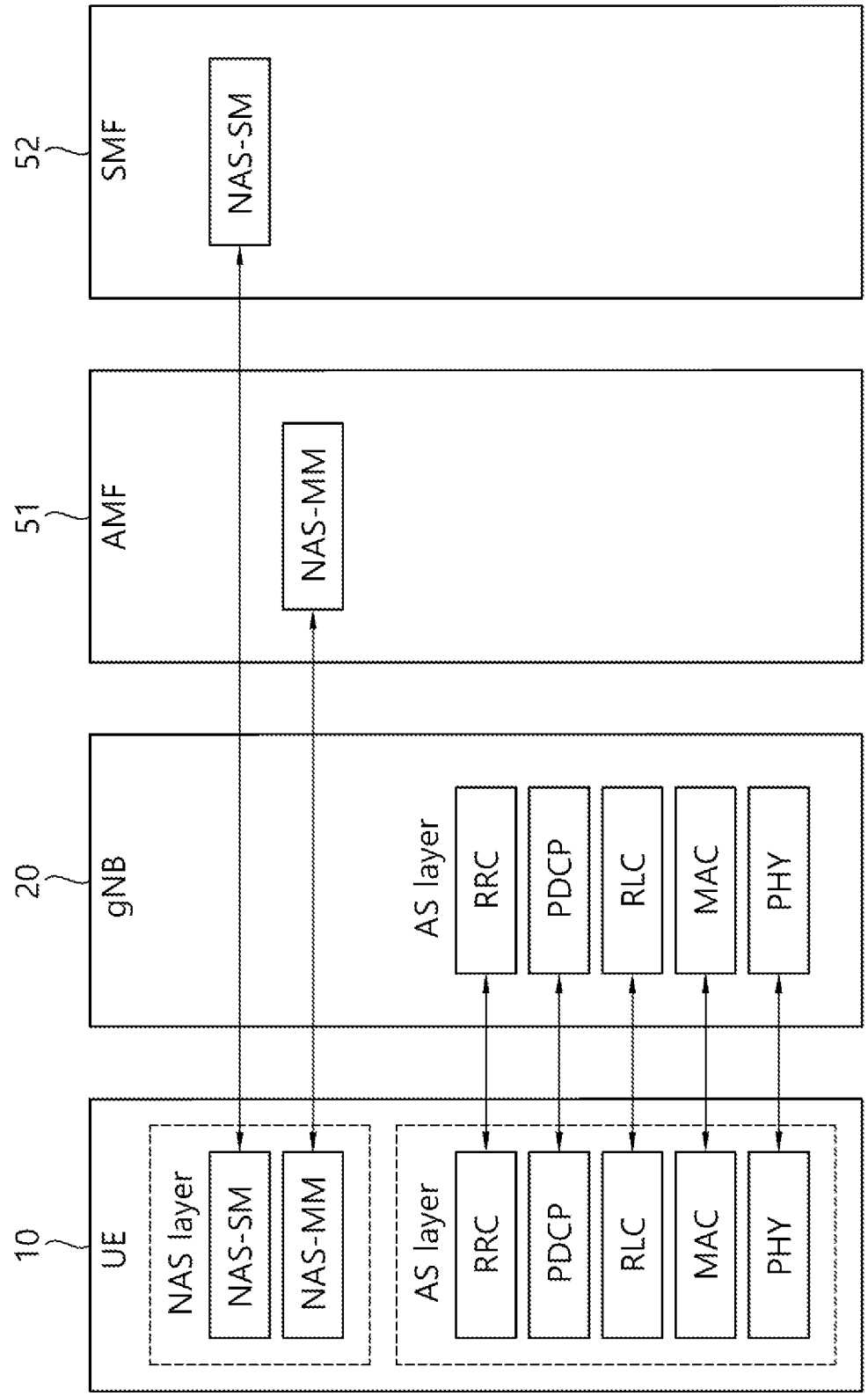
FIG. 5 is another exemplary diagram showing a structure of a radio interface protocol between a UE and a gNB.

FIG. 5 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.

NAS procedures related to AMF include the following.
Registration management and access management procedures. AMF supports the following functions.
Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
The NAS entity for the MM creates a NAS-MM message that derives how and where to deliver an SM signaling message through a security header representing the NAS transmission of SM signaling and additional information on a received NAS-MM.
Upon receiving SM signaling, the NAS entity for the SM performs an integrity check of the NAS-MM message, analyzes additional information, and derives a method and place to derive the SM signaling message.

Meanwhile, in FIG. 5, the RRC layer, the RLC layer, the MAC layer, and the PHY layer located below the NAS layer are collectively referred to as an access stratum (AS).

On the other hand, in order to achieve the URLLC stipulated in 5GAA (5G Automotive Association) and 5G, it should take less than 5 msec for the server to receive vehicle status information from the vehicle and the vehicle to receive control data from the server and the vehicle to operate. That is, operations that the cloud server to collect in-vehicle sensor data, and after analysis is completed, the cloud server to transmit a control command to the TCU (Telematics Communication Unit), and the TCU to deliver it to the target ECU (Electronic Control Unit) must be completed within 5 msec.

In the conventional cloud server-based network structure (eg, base station-wired network-cloud server), it takes about 30-40 msec for operations that data is transmitted from the base station to the cloud server, the cloud server analyzes the data to transmit the data to the base station, and the base station receives it.

To achieve ultra-reliable and low latency communications (URLLC), the European Telecommunications Standards Institute (ETSI) and 5GAA are discussing Multi-access Edge Computing (MEC).

<Multi-Access Edge Computing(MEC)>

MEC is a network architecture that enables cloud computing capabilities and IT service environments at the edge of a cellular network (typically, the edge of any network). The basic idea of MEC is to run applications (applications) and perform processing tasks related to the cellular customer, thereby reducing network congestion and making applications better. MEC technology is designed to be implemented in a cellular base station or other edge node. MEC technology may rapidly and flexibly deploy new applications and new services for customers. MEC enables cellular operators to open a Radio Access network (RAN) to authorized third parties such as application developers and content providers.

The MEC server described in this specification refers to a communication device that provides a cloud computing function or an IT service environment at the edge of a network.

FIGS. 6a to 6d show an example implementation of the MEC server.

The user plane function (UPF) node 630 of FIGS. 6a to 6d is a type of gateway through which user data is transmitted and received. The UPF node 630 may perform all or part of the user plane functions of a serving-gateway (S-GW) and a packet data network-gateway (P-GW) of 4G mobile communication. The core network 640 may be an Evolved Packet Core (EPC) or a 5G Core Network (5GC). N3 is a reference point between the (R)AN and the UPF node 630. N6 is a reference point between the UPF node 630 and the data network. The base station 620 may be a 5G base station (gNB) or an LTE base station (eNB). The base station 620 may be a base station including both a gNB and an eNB.

The AMF 650 is an Access and Mobility Management Function, and is a Control Plane Function (CPF) for managing access and mobility. The SMF 660 is a Session Management Function and is a control plane function for managing data sessions such as PDU (Protocol Data Unit) sessions.

Logically, the MEC server (MEC host) 610 may be implemented in an edge or central data network. The UPF may perform a role to coordinate user plane (UP) traffic to a target MEC application (application in the MEC server 610) of the data network. The location of the data network and UPF can be selected by the network operator. Network operators may deploy physical computing resources based on technical and business variables such as available facilities, supported applications and application requirements, measured or estimated user loads, and the like. The MEC management system may dynamically determine a location to deploy the MEC application by coordinating the operation of the MEC server 610 (MEC host) and the application.

Figure 6A:
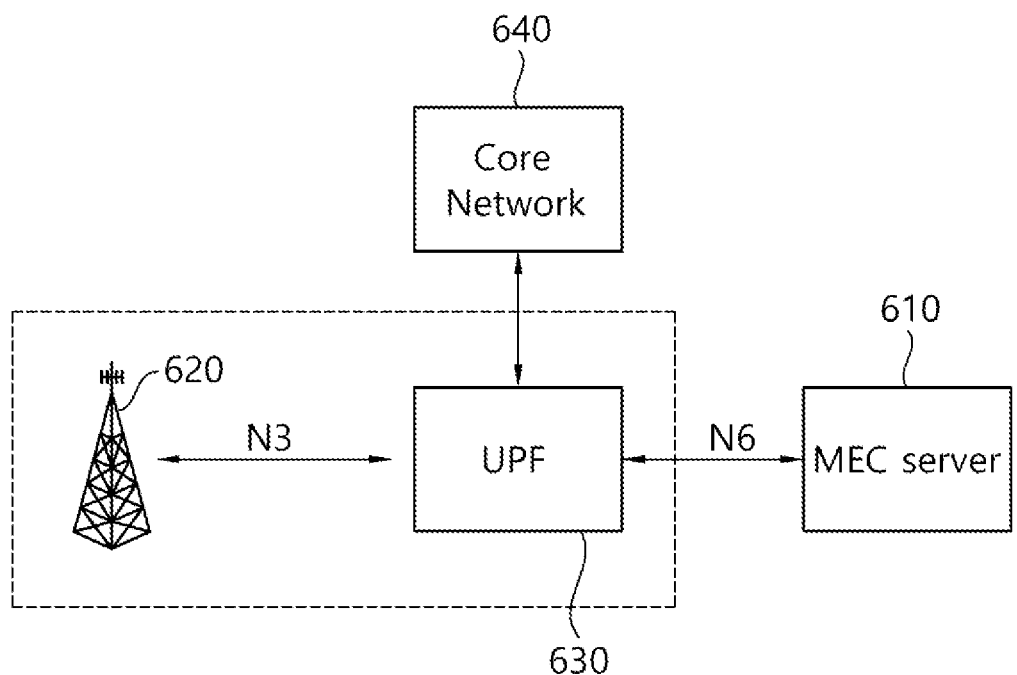
FIGS. 6a to 6d show an example implementation of the MEC server.
Figure 6B:
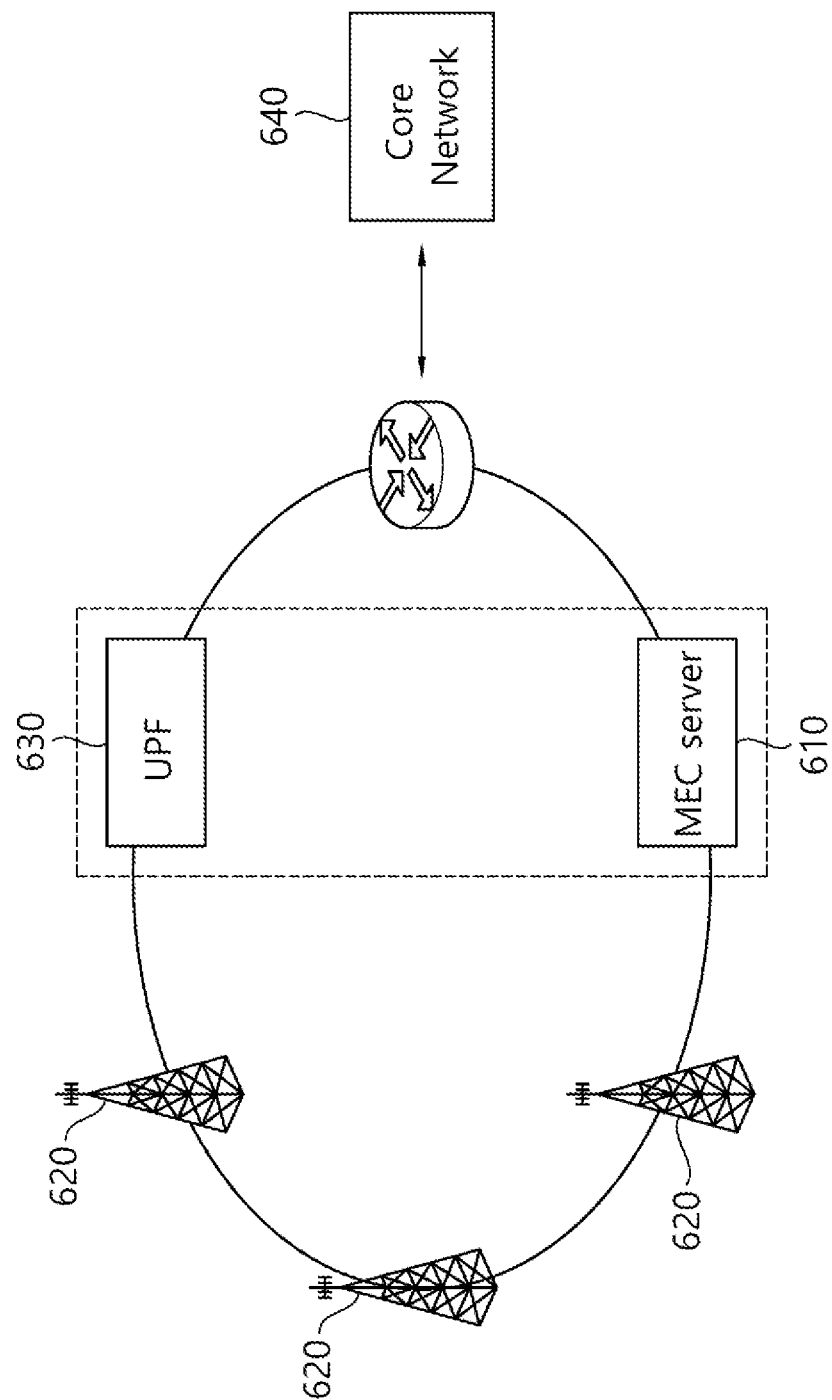
Figure 6C:
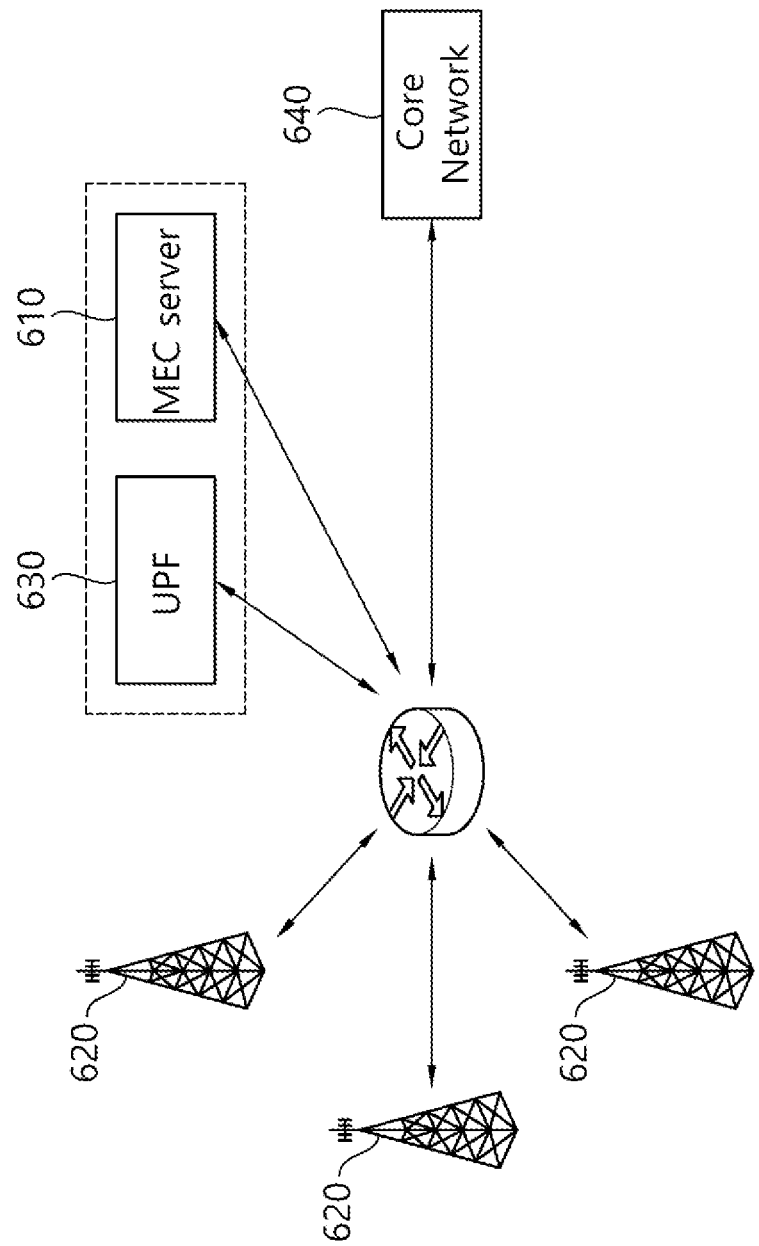
Figure 6D:
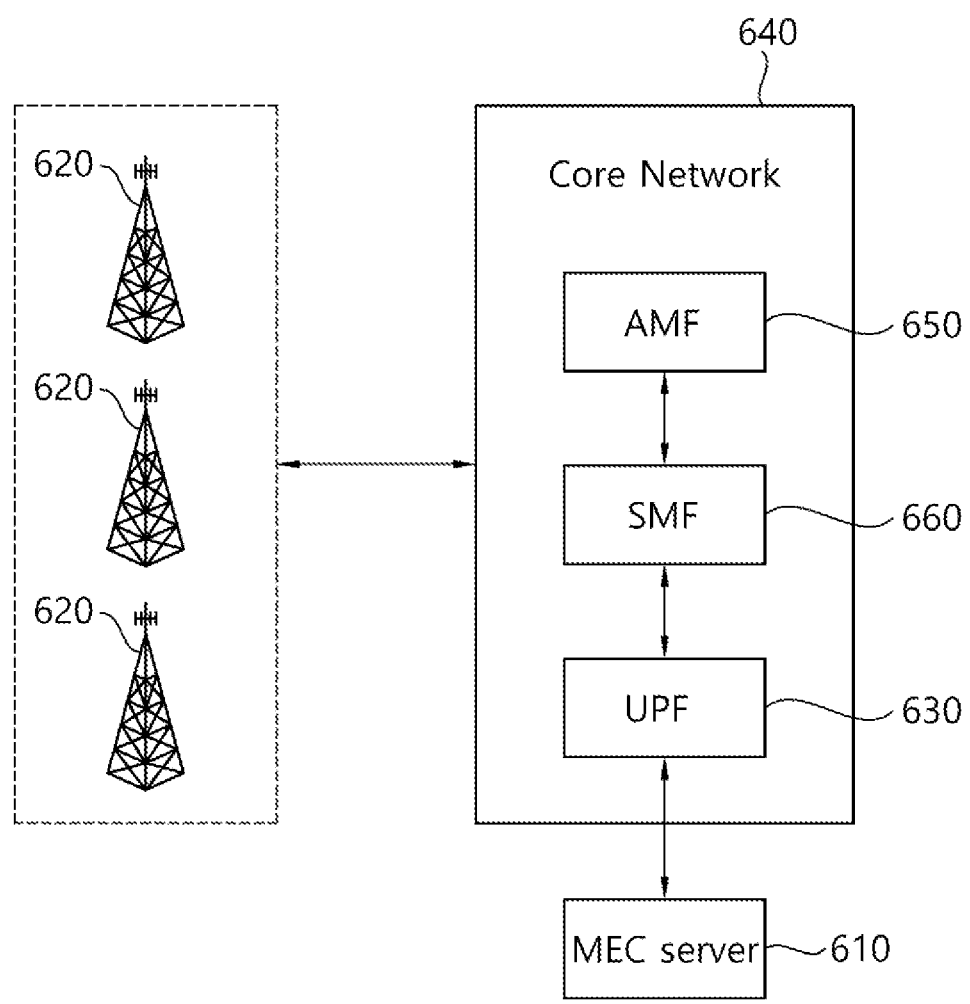

FIG. 6a is an implementation example in which the MEC server 610 and the UPF node 630 are deployed together with the base station 620. FIG. 6b is an example implementation in which the MEC server 610 is co-located with a transmitting node (eg, UPF node 630). In FIG. 6b, the core network 640 may communicate with the UPF node 630 and the MEC server 610 through a network aggregation point. FIG. 6c is an example implementation in which the MEC server 610 and the UPF node 630 are deployed together with a network aggregation point. FIG. 6d is an example implementation in which the MEC server 610 is deployed with core network 640 functions. In FIG. 6d, the MEC server 610 may be deployed in the same data center as the core network 640 functions.

<Disclosure of the Present Specification>

Figure 7:
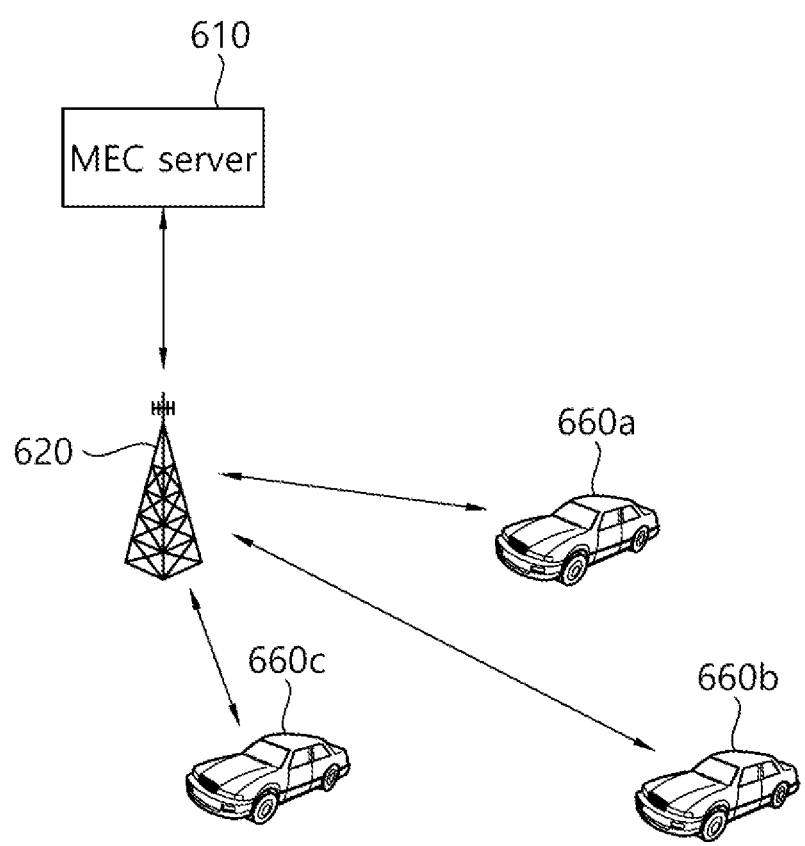
FIG. 7 shows an example in which the MEC server remotely controls the vehicle.

FIG. 7 shows an example in which the MEC server remotely controls the vehicle.

Referring to FIG. 7, an MEC server 610, a base station 620, and vehicles 660a to 660c are shown. The base station 620 may be a gNB or an eNB. The base station 620 may be a base station including both a gNB and an eNB. The MEC server 610 may be connected to the base station 620 through wired communication or wireless communication. The MEC server 610 may transmit data to or receive data from the base station 620. Although the figure shows that the MEC server 610 and the base station 620 are directly connected, this is only an example, and the MEC server 610 may be connected to the base station 620 through another network node. The base station 620 may transmit/receive data to and from a Telematics Communication Unit (TCU) mounted in the vehicles 660a to 660c.

The TCU may obtain status information from devices mounted on the vehicles 660a to 660c, and the status information may include various sensor data, video data, and the like. The TCU may transmit state information (or vehicle-related information including the state information) to the base station 620, and the base station 620 may transmit the state information to the MEC server 610. Then, the MEC server 610 may transmit data for controlling the vehicles 660a to 660c to the base station 620 based on the state information. When the base station 620 transmits data for controlling the vehicles 660a to 660c to the TCU, the TCU may control the vehicles 660a to 660c by transmitting the received data to devices mounted on the vehicles 660a to 660c. Then, the MEC server 610 may transmit map information to the base station 620, and the base station 620 may transmit it to the TCU. The TCU may control the vehicles 660a to 660c using the map information.

A TCU mounted on the MEC server 610 and the vehicles 660a to 660c will be described in detail with reference to FIG. 8.

Figure 8:
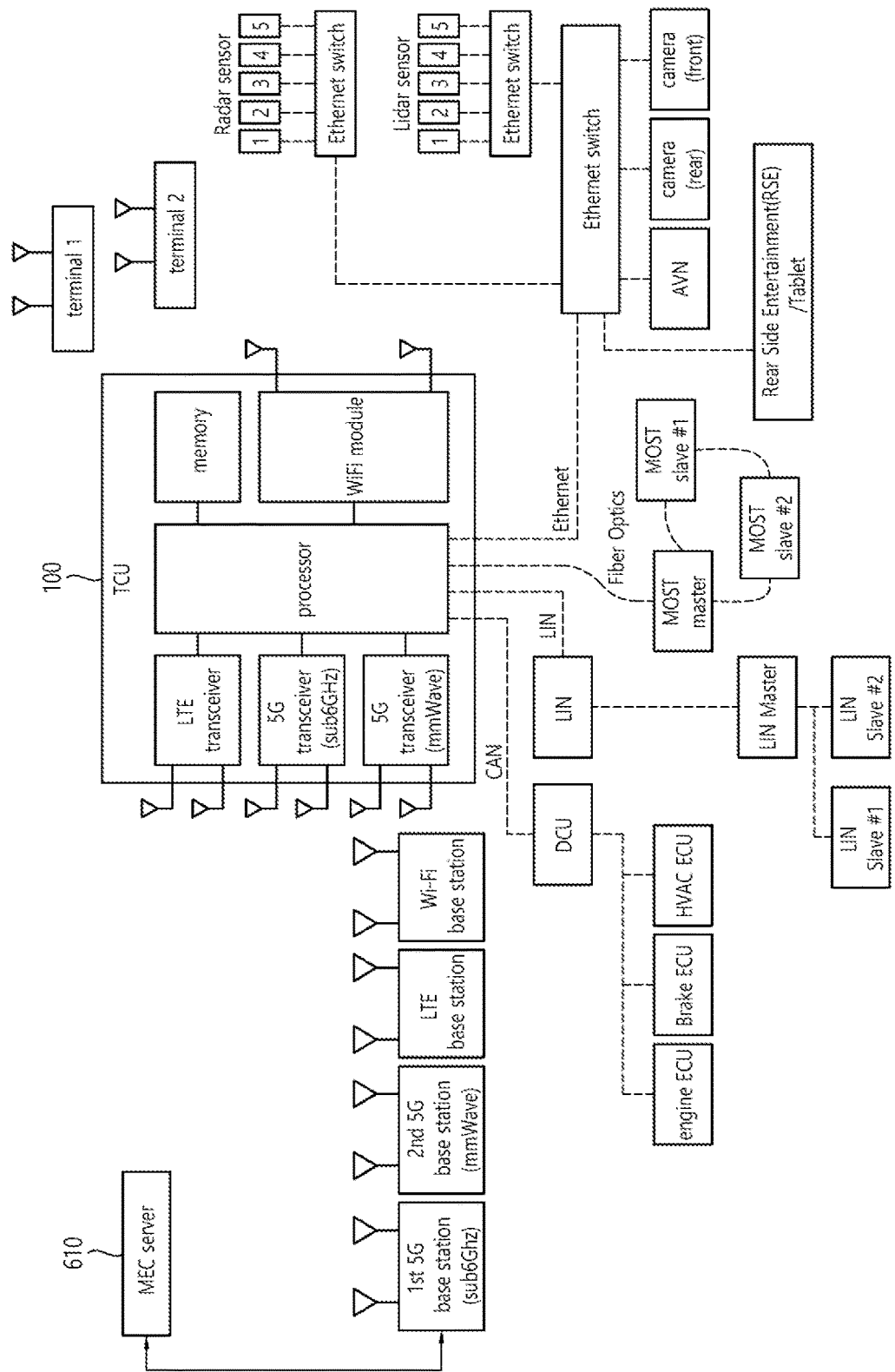
FIG. 8 is a block diagram illustrating an example of an MEC server and an example of a TCU according to the disclosure of the present specification.

FIG. 8 is a block diagram illustrating an example of an MEC server and an example of a TCU according to the disclosure of the present specification.

The MEC server is the MEC server 610 described with reference to FIGS. 6a to 6d and 7, and will be described below by omitting reference numerals. The TCU 100 is a TCU mounted on the vehicles 660a to 660c described with reference to FIG. 7, and will be described below by omitting reference numerals.

The MEC server may be implemented as in the examples described with reference to FIGS. 6a to 6d. Although it is illustrated in FIG. 8 that the MEC server directly communicates with the base stations, this is only an example, and the MEC server may communicate with the base stations through another network node (eg, a UPF node). The MEC server may include a processor (not shown) and a memory (not shown). The memory can store the MEC server app. The processor may perform the operations described in the disclosure of this specification by using the MEC server app stored in the memory. MEC server app is, for example, VR/AR app, video app, camera data analysis app, sensor data analysis app (including lidar sensor data analysis app and radar sensor data analysis app), engine ECU data analysis app, speed ECU data analysis app, HVAC ECU data analysis app, an ECU control app, a control command sending app, a baseball app, a golf app, and the like.

A 5G base station (sub6 GHz) is a base station that performs communication based on the 5G standard in the FR1 (Frequency Range 1) band (frequency band below 7125 MHz). A 5G base station (mmWave) is a base station that performs communication based on the 5G standard in the FR2 (Frequency Range 2) band (frequency band of 24250-52600 MHz). The LTE base station is a base station that performs communication based on the LTE standard. A Wi-Fi base station is a base station that performs communication based on the Wi-Fi standard. The MEC server may communicate with the TCU using at least one of a 5G base station (sub6 GHz), a 5G base station (mmWave), an LTE base station, and a Wi-Fi base station.

The TCU may include an LTE transceiver, a 5G transceiver (sub6 GHz), a 5G transceiver (mmWave), a WiFi transceiver, a processor and a memory. The LTE transceiver is a communication transceiver (ie, a transceiver) that performs communication (transmission/reception of data) based on the LTE standard. The 5G transceiver (sub6 GHz) is a communication transceiver (ie, a modem) that performs communication (transmission/reception of data) based on the 5G standard in the FR 1 band. The 5G transceiver (mmWave) is a communication transceiver (ie, transceiver) that performs communication (transmission and reception of data) based on the 5G standard in the FR 2 band. The WiFi transceiver is a communication transceiver (ie, a transceiver) that performs communication (transmission and reception of data) based on the WiFi standard. The LTE transceiver, 5G transceiver (sub6 GHz), 5G transceiver (mmWave) and WiFi transceiver can be connected with the processor through an interface such as PCIe (PCI express). In addition, although the LTE transceiver, 5G transceiver (sub6 GHz), 5G transceiver (mmWave), and WiFi transceiver are each shown as separate objects, but one communication transceiver may perform functions of the LTE transceiver, 5G transceiver (sub6 GHz), 5G transceiver (mmWave) and WiFi transceiver.

The processor of TCU is connected with LTE/5G transceiver (sub6 GHz), LTE/5G transceiver (mmWave), WiFi transceiver and memory. The memory may store MEC client apps. The processor may receive data transmitted by base stations or terminals (terminal 1 and terminal 2) using an LTE transceiver, a 5G transceiver (sub6 GHz), a 5G transceiver (mmWave), and a WiFi transceiver. The processor may transmit data to base stations or terminals (terminal 1 and terminal 2) using an LTE transceiver, a 5G transceiver (sub6 GHz), a 5G transceiver (mmWave), and a WiFi transceiver. Here, the terminals (terminal 1 and terminal 2) may be wireless communication devices used by a user in a vehicle. In addition, the processor of the TCU may perform the operations described in the disclosure of this specification by using the MEC client app stored in the memory.

The processor of the TCU may be connected to electronic devices in the vehicle. For example, the processor may be connected to a Domain Control Unit (DCU), a Local Interconnect Network (LIN) master, a Media Oriented System Transport (MOST) master, and an Ethernet switch. The processor of the TCU may communicate with the DCU using CAN (Controller Area Network) communication technology. The processor of the TCU can communicate with the LIN master using LIN (Local Interconnect Network) communication technology. The processor of the TCU can communicate with the MOST master connected by fiber optics using MOST communication technology. The processor of the TCU can communicate with the Ethernet switch and devices connected to the Ethernet switch using Ethernet communication technology.

The DCU is an electronic device that controls a plurality of ECUs. The DCU can communicate with a plurality of ECUs using CAN communication technology. Here, CAN is a standard communication technology designed for microcontrollers or electronic devices to communicate with each other in a vehicle. CAN is a non-host bus type, message-based network protocol mainly used for communication between controllers.

The DCU may communicate with an ECU such as an engine ECU that controls the engine, a brake ECU that controls brakes, and an HVAC ECU that controls a heating, ventilation, & air conditioning (HVAC) device, etc. The DCU may transmit data received from the processor of the TCU to each ECU. In addition, the DCU may transmit the data received from each ECU to the processor of the TCU.

The LIN master may communicate with LIN slaves (LIN Slave #1 and LIN Slave #2) using LIN communication technology. For example, LIN Slave #1 may be a slave that controls one of a steering wheel, a roof top, a door, a seat, and a small motor. Here, LIN is a serial communication technology for communication between components in an automobile network. The LIN master may receive data from the processor of the TCU and transmit it to the LIN slaves (LIN Slave #1 and LIN Slave #2). In addition, the LIN master may transmit data received from the LIN slaves to the processor of the TCU.

The MOST master may communicate with the MOST slaves (MOST Slave #1 and MOST Slave #2) using MOST communication technology. Here, MOST is a serial communication technology that transmits audio, video, and control information using an optical cable. The MOST master may transmit data received from the processor of the TCU to the MOST slaves. Also, the MOST master can transmit data received from the MOST slaves to the processor of the TCU.

Ethernet is a computer networking technology used in local area networks (LAN), metropolitan area networks (MAN), and wide area networks (WAN). The processor of the TCU can transmit data to each electronic device through an Ethernet switch using Ethernet communication technology. Each electronic device can transmit data to the processor of the TCU through an Ethernet switch using Ethernet communication technology.

Radar (radio detection and ranging) is a technology for measuring the distance, direction, angle, and velocity of a target using radio waves. The radar sensors 1 to 5 are provided in the vehicle to measure the distance, direction, angle, and speed of objects around the vehicle. The radar sensors 1 to 5 may transmit the measured sensor data to the processor of the TCU.

LiDAR (light detection and ranging) is a sensing technology that uses a light source and a receiver to detect a remote object and measure a distance. Specifically, lidar is a technology that measures the distance, intensity, speed, etc. to the target by illuminating the target with pulsed laser light and measuring the pulse reflected by the sensor. The lidar sensors 1 to 5 measure the distance to the target, speed, and the like. The lidar sensors 1 to 5 may transmit the measured sensor data to the processor of the TCU.

For reference, although radar sensors and lidar sensors are illustrated in FIG. 8 as using Ethernet communication technology, the radar sensors and lidar sensors may also use CAN communication technology.

AVN (Audio, Video, Navigation) is a electronic device provided in a vehicle to provide sound, video, and navigation. AVN may receive data from the processor of the TCU using Ethernet communication technology, and provide sound, image, and navigation based on the received data. AVN can transmit data to the processor of the TCU using Ethernet communication technology.

The camera (front) and the camera (rear) can capture images from the front and rear of the vehicle. Although it is illustrated in FIG. 8 that there is one camera in the front and one in the rear, this is only an example, and cameras may be provided on the left and right sides. In addition, a plurality of cameras may be provided in each of the front and rear. The cameras may transmit camera data to, and receive data from, the processor of the TCU using Ethernet communication technology.

Rear Side Entertainment (RSE) means rear seat entertainment. RSE is a electronic device installed behind the passenger seat or behind the driver's seat of a vehicle to provide entertainment to the occupants. A tablet may also be provided inside the vehicle. The RSE or tablet may receive data from the processor of the TCU and transmit the data to the processor of the TCU using Ethernet communication technology.

In the conventional cloud server-based network structure (eg, base station-wired network-cloud server), it takes about 30-40 msec for that data is transmitted from the base station to the cloud server, the cloud server analyzes the data to transmit the data to the base station, and the base station receives it.

Specifically, a person remotely controls (Remote Driving Control) a vehicle through a conventional cloud server, or a conventional cloud server analyzes data of the vehicle's front camera/rear camera/various sensors, such that the conventional cloud server may remotely control electronic devices such as ECU, etc, mounted on the vehicle. At this time, if the device mounted on the vehicle or the user's terminal is using a high-capacity real-time data service (multimedia data such as VR/AR, 8K video streaming, etc.), the possibility of an accident may increase because the operation (brake/speed/direction control, etc.) to control the vehicle by transmitting the remote control data to the devices mounted on the vehicle within 5 msec cannot be performed.

The MEC server according to the disclosure of the present specification can perform a function of receiving/storing/transmitting/analyzing various data such as video(camera)/audio/sensor data performed in a conventional cloud server, and a function of managing the TCU and electronic devices mounted on the vehicle.

In the MEC server according to the disclosure of the present specification, there may be an MEC server application (MEC server app) for performing operations according to various purposes. The MEC server may perform the operations described in the disclosure of this specification by using the MEC server application.

In addition, in the TCU according to the disclosure of the present specification, there may be an MEC client application (MEC client app) for performing operations according to various purposes. The TCU may use the MEC client application to perform the operations described in the disclosure of this specification.

The operations of the MEC server, the mobile communication network, and the TCU to be described in the disclosure of the present specification are briefly described below. However, the following description is merely an example, and operations of the MEC server, the mobile communication network, and the TCU will be described in detail with reference to FIGS. 9 to 15.

The MEC server monitors the operation of the TCU and ECU in the vehicle to comply with regulations such as the Road Traffic Act, ISO26262 (Standard related to industrial safety, Road vehicles—Functional safety) or SAE (System Architecture Evolution) standards. If the operation of the TCU and the ECU in the vehicle violates regulations, the MEC server controls the operation of the ECU in the vehicle based on a predefined scenario.

The MEC server may analyzes vehicle-related information (eg, the status information of devices in the vehicle such as engine ECU-related data, RPM (revolutions per minute) ECU-related data, wheel-related data, brake-related data, HVAC (heating, ventilation & air conditioning) related data, etc) received from the TCU in the vehicle, and controls the operation of electronic devices in the vehicle connected to the TCU based on a predefined operation scenario.

When the MEC server transmits control data for a plurality of target devices in the vehicle at once, the TCU may transmit data frames, which is based on a plurality of communication technologies (CAN/LIN/Flexray/MOST/Ethernet), by combining the data frames in one message. in order to efficiently transmit control data to the plurality of target devices. The TCU may transmit a data frame based on each communication technology to a target device in the vehicle (eg, a controller/master such as ECU, a LIN master). The TCU transmits the execution result of the control data provided from the MEC server to the MEC server, and the MEC server can determine the failure/success of the control data transmission (FAIL/SUCCESS).

If the result of the target device (the device that will receive the data sent by the MEC server) executing the control data (sent by the MEC server) is FAIL or there is a delay in the target device, the MEC server may retransmit the same control data for a predetermined number of times (eg, 10). In this case, the MEC server may retransmit the control data using the beam having the highest data rate.

To secure safety, the MEC server may retransmit the same control command by selecting at least one beam of the beams with the highest data rate among the beams of the 5G_sub6 Ghz base station, the beam with the highest data rate among the beams of the 5G_mmWave base station, and the beam with the highest data rate among the beams of the LTE base station.

The MEC server may monitor the operating state of the TCU and determine the current state of the TCU. For example, the MEC server may monitor the operation state of the TCU, and determine the current state of the TUC as one of inactive, active, sleeping, and moving.

The MEC server may receive vehicle-related information (eg, vehicle location-related information) from the TCU and manage the vehicle location (eg, collect/analyze/control/record).

The MEC server may receive vehicle-related information (eg, vehicle speed-related information) from the TCU and manage (eg, collect/analyze/control/record) vehicle speed-related information. The MEC server manages information related to the speed of the vehicle to determine whether the vehicle is overspeeding, whether the vehicle complies with a safe speed, and the like.

The MEC server may receive vehicle-related information (eg, engine ECU information) from the TCU and manage (eg, collect/analyze/control/record) engine ECU (Engine controlling ECU) information.

The MEC server receives vehicle-related information (eg, information received from sensors and cameras mounted on the vehicle) from the TCU and manages (eg. collected/analyzed/controlled/recorded) information of vehicle sensor and camera (Lidar, Radar, and front/rear/measurement/cabin cameras).

As a result of analyzing vehicle sensor and camera information, if a vehicle collision with pedestrians, obstacles, etc is expected, the MEC server controls the ECU (engine ECU, brake ECU, etc.) in the vehicle by transmitting control data to the TCU based on the emergency response scenario.

In order to distinguish control data (data based on ECU, MOST, LIN, FlexRay, etc.) and general (or normal) data used for multimedia services (high-capacity real-time data such as AR/VR/video/audio) transmitted to electronic devices (ECU, etc.) mounted on the vehicle, the MEC server may transmit a message including a tag for each type of data, which to be transmitted to the TCU, to the TCU.

After checking the tag of the data included in the message received from the MEC server, the TCU may first store the control data used for vehicle control in the buffer of the memory. In addition, the TCU may transmit control data from a memory to a device such as an ECU controller, and thereafter, high-capacity real-time data (ie, general data) may be transmitted after transmitting the control data.

When there is a large number of control data received from the MEC server, the TCU may transmit the control data of the highest priority to the electronic device mounted on the vehicle according to the priority of the tag of the control data.

The MEC server may transmit general data to the TCU so that a timeout does not occur for each service of general data in consideration of requirements (delay time, etc.) of general data.

In addition, in consideration of the general data requirements (delay time, etc.), the TCU may also transmit the general data received from the MEC server to the devices mounted on the vehicle so that a timeout does not occur for each service of general data.

For reference, in the present specification, control data means data including commands for controlling an autonomous driving-related device and a device controlling vehicle among electronic devices mounted on a vehicle. The control data may include, for example, data based on communication technologies such as CAN, LIN, Flexray, and MOST, and data related to terrain used for autonomous driving, such as HD-MAP.

In the present specification, general data means data to be transmitted to a electronic device not directly related to autonomous driving among devices in a vehicle and to a terminal of a user riding in the vehicle. General data includes data related to multimedia services (AR/VR/video/audio) and other high-capacity real-time data.

As described in the background section, there is no existing method by which data transmission/reception between the MEC server and the TCU mounted on the vehicle can be performed quickly and efficiently.

For example, if the MEC server transmits 20 Gbps of data (eg, 8k video, 8k AR/VR, etc.) to the TCU through the base station, the TCU may transmit data to the in-vehicle terminal using the WiFi transceiver. If the data rate of the WiFi transceiver is about 500 Mbps, data of 20 Gbps cannot be received.

While receiving high-capacity streaming data (eg 8k video, 8k AR/VR, etc.), the TCU could not effectively transmit camera data and sensor data (radar sensor data, lidar sensor data) to be used for vehicle remote control at the same time. Here, the data rate of the camera data may be 12 Gbps or more, and the data rates of the radar sensor data and the lidar sensor data may be 10 Gbps or more, respectively.

In addition, in order for the MEC server to remotely control the vehicle, the TCU needs to transmit as much camera data and sensor data as possible to the MEC server. However, in the prior art, there is a problem that sufficient time resources are not allocated for uplink transmission from the TCU to the MEC server.

The disclosure of the present specification proposes a method for solving the above-described problems.

TCU may transmit camera data (generated by 12 cameras, min. 12 Gbps) and sensor data (generated by min. 8 sensors, min. 8-80 Gbps) to the MEC server. The MEC server may analyze camera data and sensor data to transmit ECU control data to the TCU. Because the computing power of the MEC server is better than that of the TCU, the MEC server may analyze camera data and sensor data faster than the TCU and effectively generate ECU control data.

Conventional communication between the TCU and MEC was performed in order of downlink (MEC server→TCU)→uplink (TCU→MEC server)→downlink (TCU→electronic device including ECU and terminal)→uplink (Electronic devices including ECUs and terminals→TCU). Therefore, after receiving the ECU control command message from the MEC server, the TCU was able to transmit the ECU control command message after completing uplink data transmission to the MEC server. However, according to the disclosure of the present specification, the communication between the TCU and the MEC can be performed in order of downlink (MEC server→TCU)→downlink (TCU→electronic device including ECU and terminal)→uplink (TCU→MEC) Server)→uplink (electronic device including ECU and terminal→TCU). Accordingly, since the TCU can directly transmit the ECU control command message received from the MEC server to the ECU, the ECU control command message can be delivered to the ECU faster than before.

The TCU performs uplink scheduling when transmitting camera data and sensor data to the MEC server, so that the TCU may the TCU may completes control operation, by receiving ECU control data from the MEC server, and transferring ECU control data to ECU, within 5 msec from when the camera and sensor transmit camera data and sensor data to the TCU.

The MEC server may adjust the sampling rate of the camera and sensor based on the TCU's uplink transmission capability (available buffer size, data rate, uplink service requirements, etc.).

In order that the data rate $Cu_i(t)$ that needs to be transmitted in the uplink within the time slot for uplink transmission can be supported, the MEC server may determine a combination of transmission beams the data rate group of the TCU's transmission beam, $Ru_i(t)=\{Ru_{i,1,1}(t), \ldots, Ru_{i,a,b}(t), \ldots, RU_{i,amax,bmax}(t)\}$ through uplink scheduling. That is, the MEC server may determine a transmission beam used for uplink transmission of the TCU. The MEC server may transmit information on the determined transmission beam to the TCU, and the TCU may perform uplink transmission using the transmission beam determined by the MEC server. Or, TCU may determine combination of the transmission beams from $Ru_i(t)=\{Ru_{i,1,1}(t), \ldots, Ru_{i,a,b}(t), \ldots, Ru_{i,amax,bmax}(t)\}$, data rate group of transmission beam of TCU by uplink scheduling. Hereinafter, operation of the MEC server, TCU and mobile communication network (including the base station) according to the disclosure of the present specification will be described in detail with reference to FIGS. 9 to 15. Hereinafter, the disclosure of the present specification will be described focusing on a case in which one TCU exists, but this is only an example, and operations described in the present disclosure may be applied even when a plurality of TCUs exist.

Figure 9:
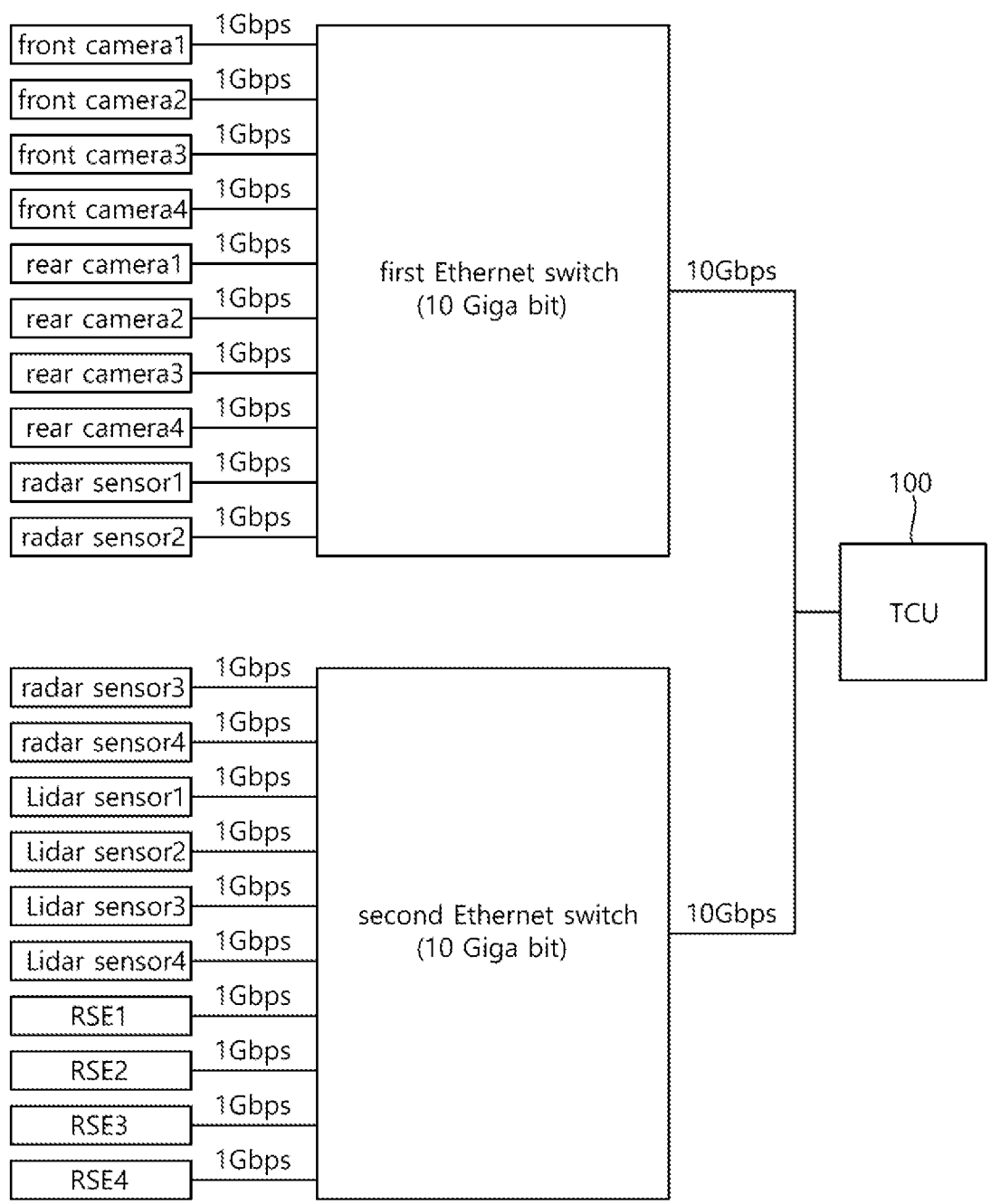
FIG. 9 illustrates an example in which the TCU of FIG. 8 is connected to one or more electronic devices.

FIG. 9 illustrates an example in which the TCU of FIG. 8 is connected to one or more electronic devices.

Referring to FIG. 9, an example in which the TCU of FIG. 8 is connected to a plurality of electronic devices through an Ethernet switch is shown.

The communication speed of the first Ethernet switch and the second Ethernet switch of FIG. 9 may be 10 Gbps. However, this is merely an example, and the communication speed of the Ethernet switch may be 10 Gbps or less or may exceed 10 Gbps. In addition, although only two Ethernet switches are shown in FIG. 9, this is only an example, and in the scope of the present disclosure, the number of Ethernet switches connected to the TCU may be two or less or more than two.

Ten electronic devices (front cameras 1 to 4, rear cameras 1 to 4, and radar sensors 1 and 2) may be connected to the first Ethernet switch. The communication speed of each electronic device connected to the first Ethernet switch may be 1 Gbps. However, this is only an example, and the communication speed of each electronic device may be a value different from that of FIG. 9 within the range of the communication speed of the Ethernet switch.

Ten electronic devices (radar sensors 3 and 4, lidar sensors 1 to 4, and RSEs 1 to 4) may be connected to the second Ethernet switch. The communication speed of each electronic device connected to the second Ethernet switch may be 1 Gbps. However, this is only an example, and the communication speed of each electronic device may be a value different from that of FIG. 9 within the range of the communication speed of the Ethernet switch.

The raw data transfer rate of the lidar sensor and the radar sensor may be 10 Gbps, and the lidar sensor and the radar sensor may reduce the data rate to 1 Gbps depending on the performance of the vehicle's Ethernet switch. That is, the lidar sensor and the radar sensor may adjust the data rate of the sensor data by adjusting the sampling rate of the sensor data based on the Ethernet communication speed.

The TCU may transmit information on the data rate, such as a sampling rate of each electronic device, etc, to the MEC server. The MEC server may check information about the data rate of each electronic device. The MEC server may transmit a message for adjusting the sampling rate of the electronic device to the TCU in consideration of the capacity of all data (the feedback message related to multimedia data, the capacity of the camera data, the capacity of the sensor data) transmitted by the TCU. Then, the TCU may adjust the sampling rate of each electronic device by transmitting a message to each electronic device to adjust the sampling rate.

Figure 10:
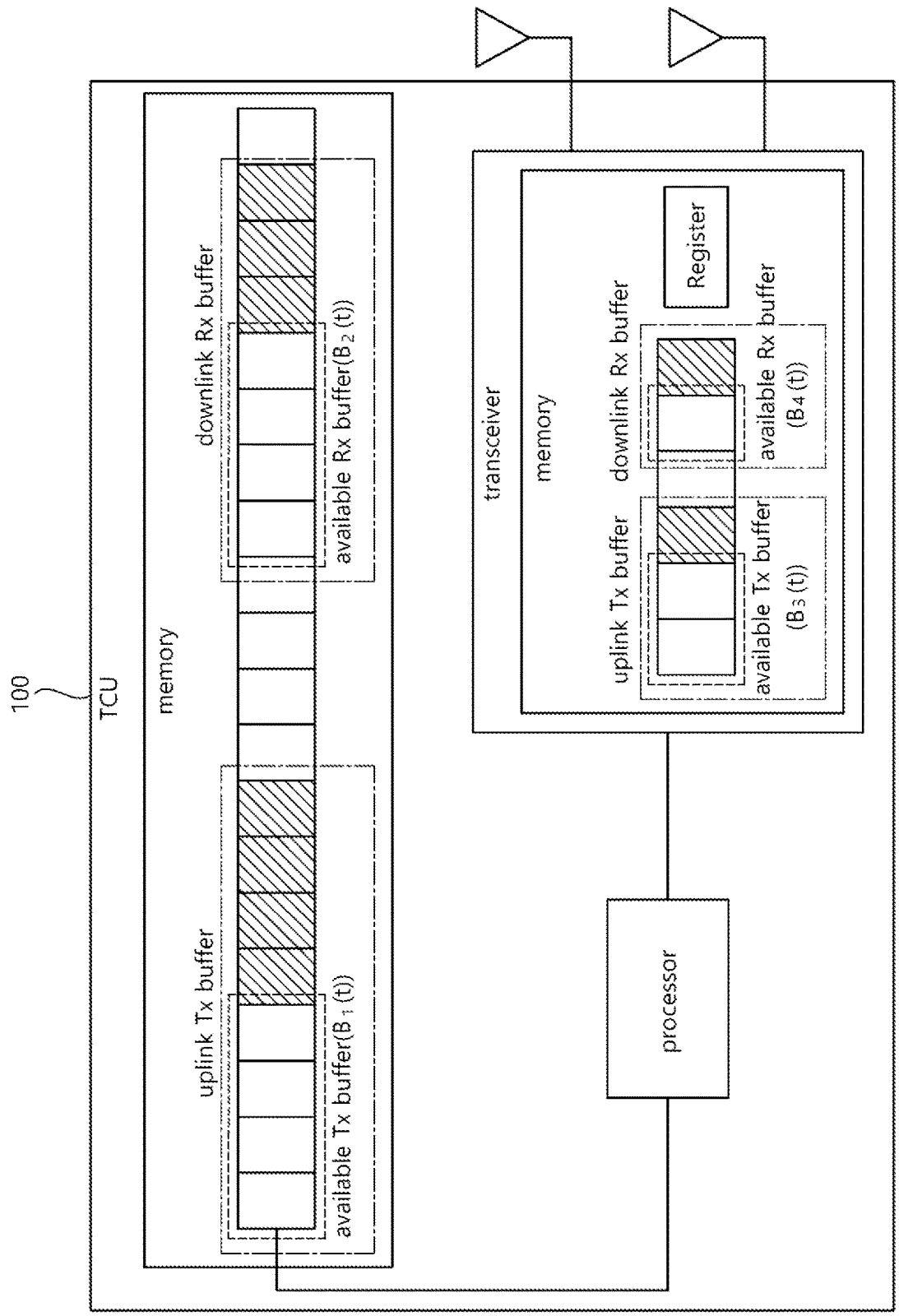
FIG. 10 shows an example of a buffer of a memory of the TCU of FIG. 8 and a buffer of a transceiver of the TCU.

FIG. 10 shows an example of a buffer of a memory of the TCU of FIG. 8 and a buffer of a transceiver of the TCU.

As shown in FIG. 10, a buffer for uplink transmission (Tx) and a buffer for downlink reception (Rx) may be allocated in a memory connected to the processor of the TCU. A buffer available in the uplink Tx buffer of the memory may be defined as an available Tx buffer $B_1(t)$. A buffer available in the downlink Rx buffer of the memory may be defined as an available Rx buffer ($B_2(t)$).

In addition, the transceiver connected to the processor of the TCU may include a memory. A buffer for uplink transmission (Tx) and a buffer for downlink reception (Rx) may be allocated to the memory of the transceiver. Here, the transceiver may be one of an LTE transceiver, a 5G transceiver (sub6 GHz), a 5G transceiver (mmWave), or a WiFi transceiver shown in FIG. 8. A buffer available in the uplink Tx buffer of the transceiver may be defined as an available Tx buffer $B_3(t)$. A buffer available in the downlink Rx buffer of the memory may be defined as an available Rx buffer ($B_4(t)$).

An operating system (OS) such as Linux may be installed in the transceiver (eg, 5G transceiver, LTE transceiver) of the TCU, and the transceiver may operate independently.

The TCU may use not only an available Tx buffer ($B_1(t)$) and an available Rx buffer ($B_2(t)$) in the memory of the TCU, but also an available Tx buffer ($B_3(t)$) and an available Rx buffer ($B_4(t)$) in the transceiver to buffer data.

After buffering data in the uplink Tx buffer, the transceiver may transmit the buffered data to the base station or the terminal. For example, the 5G transceiver (mmWave) may transmit buffered data at a data rate of 20 Gbps.

FIGS. 11a and 11b are signal flow diagrams illustrating examples of operations of a TCU, an MEC server, and a mobile communication network according to the disclosure of the present specification.

Referring to FIGS. 11a and 11b, in step S1101, the MEC server may receive TCU information connected to the base station from a mobile communication network including the base station. Hereinafter, a mobile communication network means a mobile communication network including a base station. The MEC server may receive information on all TCUs connected to the base station. The TCU information may include a list of TCU IDs, information on a channel between the TCU and the base station, timing information on communication between the TCU and the base station, and the like. In addition, the TCU information may further include information on a service list for each TCU, a delay requirement for each service for each TCU, and a minimum data rate requirement for each service for each TCU. Here, the service may be a service related to data requested or transmitted by one or more electronic devices (eg, AVN, VR device, RSE, etc.) installed in the vehicle.

In step S1102, the MEC server may transmit a pilot signal to the mobile communication network, and the base station included in the mobile communication network may transmit the pilot signal to the TCU. The MEC server may broadcast a pilot signal by using at least one transmit beam of a 5G base station (sub 6 Ghz), at least one transmit beam of a 5G base station (mmWave), at least one transmit beam of an LTE base station, and at least one transmit beam of a WiFi base station.

In step S1103, the TCU may determine channel state information for a radio channel between the TCU and the base station based on the received pilot signal. Here, the channel state information may be a channel quality indicator (CQI).

In step S1104, the TCU may transmit channel state information to the base station. Then, the mobile communication network may transmit the channel state information to the MEC server.

In step S1105, the MEC server may determine an available data rate for a combination of the plurality of transmit beams of the base station and the plurality of receive beams of the TCU.

For example, the MEC server may determine an available data rate group $Rd_i(t)$ as shown in Table 1 below based on the channel state information.

TABLE 1

| $Rd_i(t) = \{Rd_{i,1,1}(t), \ldots, Rd_{i,j,k}(t), \ldots Rd_{i,jmax,kmax}(t)\}$ |
|---| t may be a time point at which the MEC server determines the data rate. Here, i may be an index indicating the ID of the TCU, j may be an index indicating the type of the base station, and k may be an index indicating the order number of the transmission beam in each base station. For example, the example of j is as follows.

j=1: 5G base station (mmWave)
j=2: 5G base station (sub6 Ghz)
j=3: LTE base station
j=4: WiFi base station k may exist as much as the maximum number of beams (kmax) of the corresponding base station for each base station index j. For example, when the maximum number of beams of a 5G base station (mmWave) is U, when j=1, k may be k=1 to U. When the maximum number of beams of the 5G base station (sub6 Ghz) is X, when j=2, k may be k=1 to X. When the maximum number of beams of the LTE base station is Y, when j=3, k may be k=1~Y. When the maximum number of beams of the WiFi base station is Z, k may be k=1 to Z when j=4.

For reference, the order in which steps S1102 to S1105 described above are performed is not limited to the order shown in FIGS. 11a and 11b, and may be performed periodically.

In step S1106, the TCU may obtain information about the available buffer size.

Specifically, as described in the example of FIG. 10, the TCU may obtain the size of the available Tx buffer ($B_{i,1}(t)$) and the size of the available Rx buffer ($B_{i,2}(t)$) of the memory of the TCU. there is. In addition, the TCU may obtain the size ($B_{i,3}(t)$) of the available Tx buffer in the memory of the transceiver and the size ($B_{i,4}(t)$) of the available Rx buffer. Here, the TCU may obtain $B_{i,3}(t)$ and $B_{i,4}(t)$ only for the memory of the transceiver that can transmit uplink data at 20 Gbps or more. When the TCU includes a plurality of transceivers, the TCU may obtain the size of the Tx buffer ($B_{i,3}(t)$) and the size of the available Rx buffer ($B_{i,4}(t)$) for each transceiver. Information on the available buffer size may include information on all of $B_{i,1}(t)$, $B_{i,2}(t)$, $B_{i,3}(t)$, and $B_{i,4}(t)$.

In step S1107, the TCU may obtain information on downlink service requirements. The order in which the above-described steps S1106 and S1107 are performed is not limited by the examples shown in the drawings, and may be performed periodically.

Here, the information on the downlink service requirement may include information on the data rate requirement and information on the delay requirement. In addition, the information on the downlink service requirements may further include at least one of the sampling rate of electronic device, the number of frames, whether the downlink data requested by the electronic device is raw data, or an encoding method when the downlink data of the electronic device is encoded (eg: H264, H265, HEVC, etc.). Here, the electronic device may include a plurality of cameras, a plurality of lidar sensors, a plurality of radar sensors, and a plurality of RSEs, etc illustrated in the examples of FIGS. 8 and 9.

Here, the electronic device may include a plurality of cameras, a plurality of lidar sensors, a plurality of radar sensors, and a plurality of RSEs illustrated in the examples of FIGS. 8 and 9.

In step S1108, the TCU may transmit information on the available buffer size and information on downlink service requirements to the MEC server through the base station. The TCU may also transmit information on the uplink service requirement of step S1116 to be described later to the MEC server.

The MEC server may determine the downlink data rate $Cd_{i,p,q}(t)$ required by each electronic device of the TCU based on the information on the downlink service requirement. Alternatively, the information on the downlink service requirement may include $Cd_{i,p,q}(t)$.

Here, p may be an index indicating the type of the electronic device in the vehicle. For example, p may indicate the type of electronic device such as p=1: camera, p=2: lidar sensor, p=3: radar sensor, p=4: wireless terminal, p=5: RSE, p=6: AVN, p=7: ECU, etc.

q may be an index indicating a device number within the same electronic device type. For example, when p=1 is a camera, p=1 & q=1 may be a front camera 1, and p=1 & q=10 may be a side (right) camera 2.

For example, the MEC server may determine $Cd_{i,p,q}(t)$ by using the downlink sampling rate Ld (number of samples per 1 second), the number of downlink frames Fd (number of frames per 1 second), and the number of bits per downlink frame Bd (bits per 1 second) of the electronic device. MEC server may calculate $Cd_{i,p,q}(t)$ based on $Cd_{i,p,q}(t) = Ld_{i,p,q}(t) * Fd_{i,p,q}(t) * Bd_{i,p,q}(t)$.

In addition, in the same manner as the method for determining $Cd_{i,p,q}(t)$, the MEC server may determine $Cu_{i,p,q}(t) = Lu_{i,p,q}(t) * Fu_{i,p,q}(t) * Bu_{i,p,q}(t)$, based on information on uplink service requirements. Here, Lu may represent uplink sampling data, Fu may represent the number of uplink frames, and Bu may represent the number of bits per uplink frame.

After the MEC server obtains information on the available buffer size, the MEC server may use the smaller buffer size between $B_{i,1}(t)$ and $B_{i,3}(t)$ as the Tx available buffer size $B_{i,Tx}(t)$ of the TCU, and the MEC server may use the smaller buffer size $B_2(t)$ and $B_4(t)$ as the Rx available buffer size $B_{i,Rx}(t)$ of the TCU. In other words, $B_{i,Tx}(t)$ may be $B_{i,Tx}(t) = \min(B_{i,1}(t), B_{i,3}(t))$, $B_{i,Rx}(t)$ may be $B_{i,Rx}(t) = \min(B_{i,2}(t), B_{i,4}(t))$. In step S1109, the MEC server may use at least one of $B_{i,Tx}(t)$ or $B_{i,Rx}(t)$ as information about the available buffer size of the TCU.

In step S1109, the MEC server may determine a data rate of downlink data and a first transmission beam (a transmission beam used for transmission of downlink data) based on the available data rate and information on the available buffer size. In addition, the MEC server may determine the available time Tu(t) for uplink transmission. For example, Tu(t) may be Tu(t)=data frame length (eg, 5 ms in the case of a 5G frame with a length of 5 ms)−$T_{i,B\_Rx}$. $T_{i,B\_Rx}$ will be described later with reference to FIG. 12.

In step S1110, the MEC server may transmit downlink data to the TCU through the base station. The MEC server may transmit downlink data and information on the first transmission beam to the base station. Then, the base station may transmit downlink data to the TCU by using the first transmission beam of the base station. For reference, the MEC server may request downlink data to a cloud server (eg, cloud server) related to the data (eg, VR device-related data) that needs to be provided with data from the cloud server among the downlink data requested by the TCU. In addition, the MEC server may transmit downlink data received from the cloud server to the TCU through the base station. When the MEC server requests all downlink data from the cloud server, the MEC server may request the downlink data from the cloud server as much as "$N_{max} * Cd_i(t)$" to be described in FIG. 12.

In step S1111, the TCU may transmit downlink data to at least one electronic device.

In step S1112, the TCU may transmit a pilot signal to the base station, and the mobile communication network may transmit a pilot signal to the MEC server. For example, the TCU may broadcast a pilot signal by using at least one transmission beam of a 5G transceiver (sub 6 Ghz), at least one transmission beam of a 5G transceiver (mmWave), at least one transmission beam of an LTE transceiver, or at least one transmit beam of a WiFi transceiver.

In step S1113, the MEC server may determine channel state information for a radio channel between the TCU and the base station based on the received pilot signal. Here, the channel state information may be a channel quality indicator (CQI).

In step S1114, the MEC server may transmit channel state information to the mobile communication network. Then, the base station may transmit the channel state information to the TCU.

In step S1115, the TCU may determine an available data rate for a combination of the plurality of receive beams of the base station and the plurality of transmit beams of the TCU.

For example, the TCU may determine an available data rate group as shown in Table 2 below based on the channel state information.

TABLE 2

$Ru_i(t) = \{Ru_{i, 1, 1}(t), \ldots, Ru_{i, a, b}(t), \ldots Ru_{i, amax, bmax}(t)\}$ t may be a time point at which the TCU determines the data rate. Here, i may be an index indicating the ID of the TCU, a may be an index indicating the type of the transceiver of the TCU, and b may be an index indicating the order of transmission beams in each transceiver. For example, an example of a is as follows.

a=1: 5G transceiver (mmWave)
a=2: 5G transceiver (sub6 Ghz)
a=3: LTE transceiver
a=4: WiFi transceiver b may exist as much as the maximum number of beams (bmax) of the corresponding transceiver for the index a of each transceiver. For example, when the maximum number of beams of the 5G transceiver (mmWave) is u, k may be k=1 to u when j=1. When the maximum number of beams of the 5G transceiver (sub6 Ghz) is x, when j=2, k may be k=1 to x. When the maximum number of beams of the LTE transceiver is y, k may be k=1 to y when j=3. When the maximum number of beams of the WiFi transceiver is z, k may be k=1 to z when j=4.

For reference, the order in which steps S1112 to S1115 described above are performed is not limited to the order shown in FIGS. 11a and 11b, and may be performed periodically. For reference, step S1115 may be performed by the MEC server.

In step S1116, the TCU may obtain information on uplink service requirements from one or more electronic devices.

Here, the information on the uplink service requirement may include information on the data rate requirement and information on the delay requirement. In addition, the information on the uplink service requirement may further include at least one of the sampling rate of the electronic device, the number of frames, whether the uplink data of the electronic device is raw data, or an encoding method (eg, H264, H265, HEVC, etc.) when the uplink data of the electronic device is encoded, etc. Here, the electronic device may include a plurality of cameras, a plurality of lidar sensors, a plurality of radar sensors, and a plurality of RSEs illustrated in the examples of FIGS. 8 and 9.

In addition, the information on the uplink service requirements may include information about camera data, sensor data, ECU execution result message, RSE multimedia execution result message, AVN data execution result/request, requests of wireless terminals, etc. And, the information on the uplink service requirements may include $D_i(t)$, a delay requirement group of each electronic device, $D_i(t)=\{D_{i,1,1}(t), \ldots, D_{i,p,q}(t), \ldots, D_{i,pmax,qmax}(t)\}$.

The TCU may transmit information on uplink service requirements to the MEC server.

In step S1117, the TCU may determine a second transmission beam (a transmission beam used for uplink data transmission) based on the information on the available buffer size, the information on the uplink service requirement, and the available data rate. The TCU may perform step S1117 so that uplink data transmission is performed within a time $Tu(t)$ available for uplink transmission.

Figure 14:
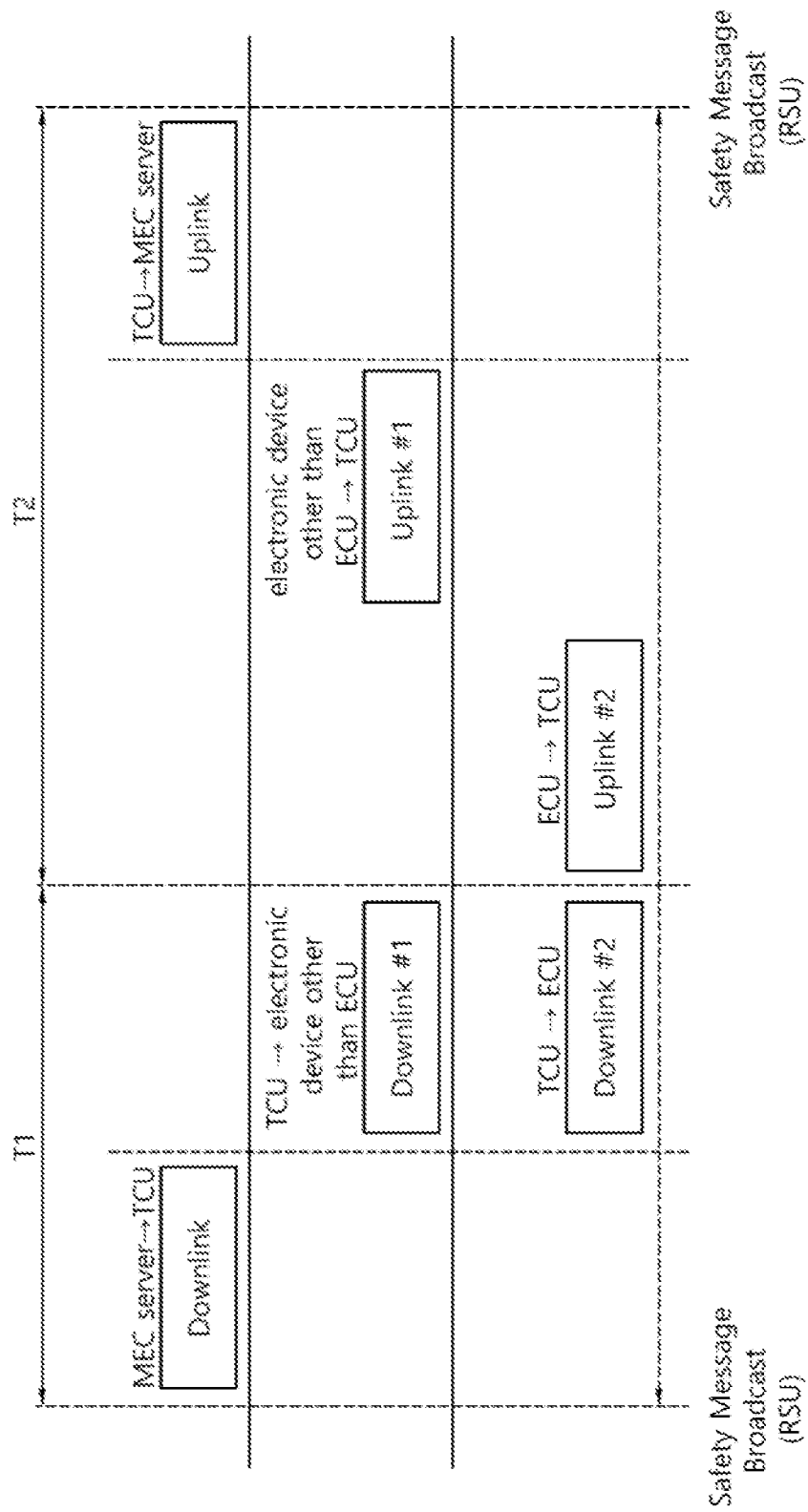
FIG. 14 shows a first example of downlink communication and uplink communication of a TCU, an MEC server, and a mobile communication network according to the disclosure of the present specification.
Figure 15:
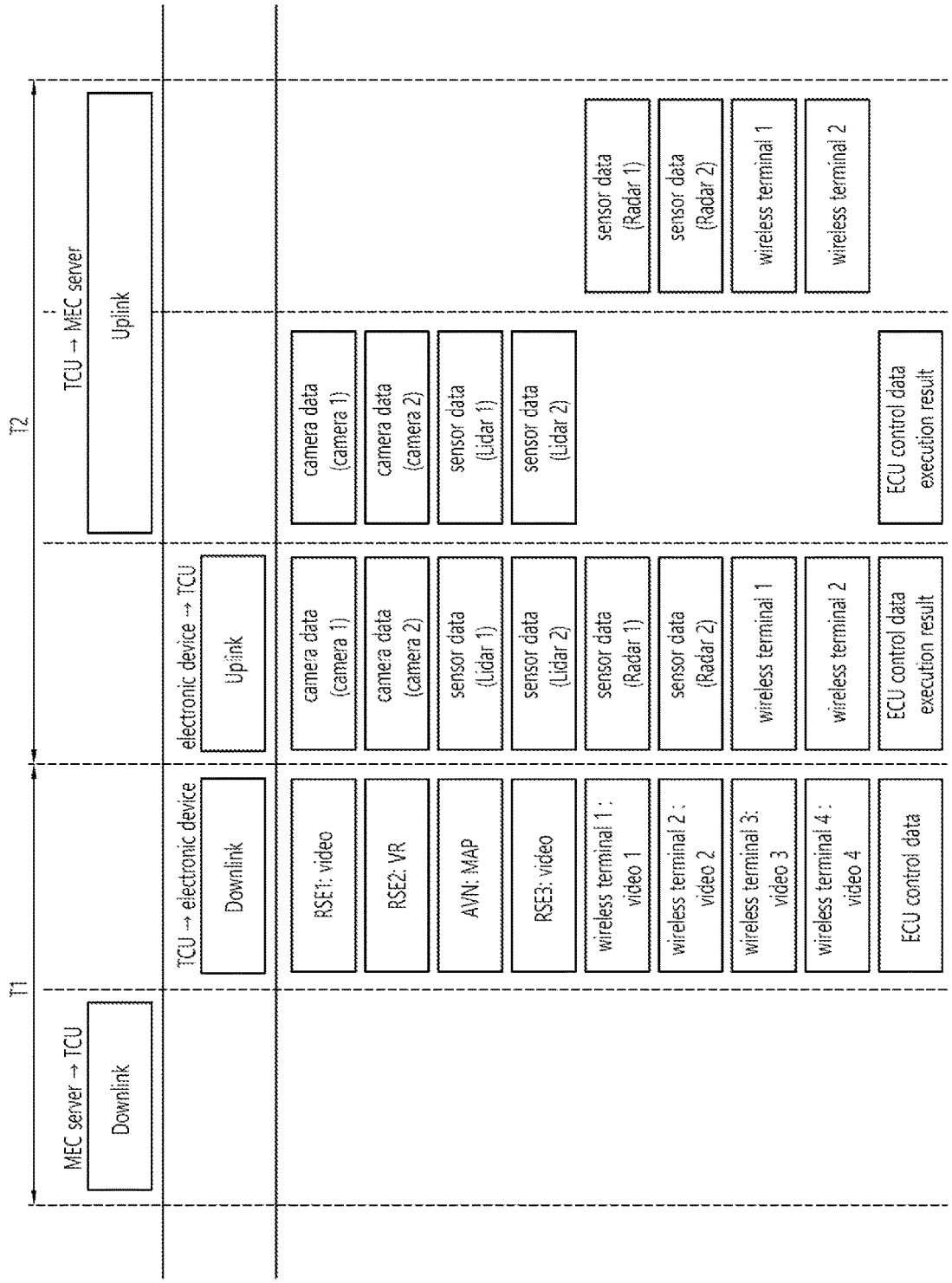
FIG. 15 shows a second example of downlink communication and uplink communication of a TCU, an MEC server, and a mobile communication network according to the disclosure of the present specification.

The TCU may allocate uplink data to be transmitted to the MEC server for each time slot. An example in which the TCU allocates uplink data for each time slot is shown in FIGS. 14 and 15.

For reference, step S1117 may be performed by the MEC server. That is, the MEC server may perform the operations described in the examples of FIGS. 14 and 15. And, when the MEC server transmits information on the second transmission beam to the TCU, the TCU may perform step S1119 based on the received information on the second transmission beam.

In step S1118, the TCU may receive uplink data from one or more electronic devices. The TCU may transmit the received uplink data to the Tx buffer of the transceiver corresponding to the second transmission beam, and the transceiver may transmit the buffered uplink data to the base station using the second transmission beam.

In step S1119, the TCU may transmit uplink data to the MEC server through the base station.

Figure 12:
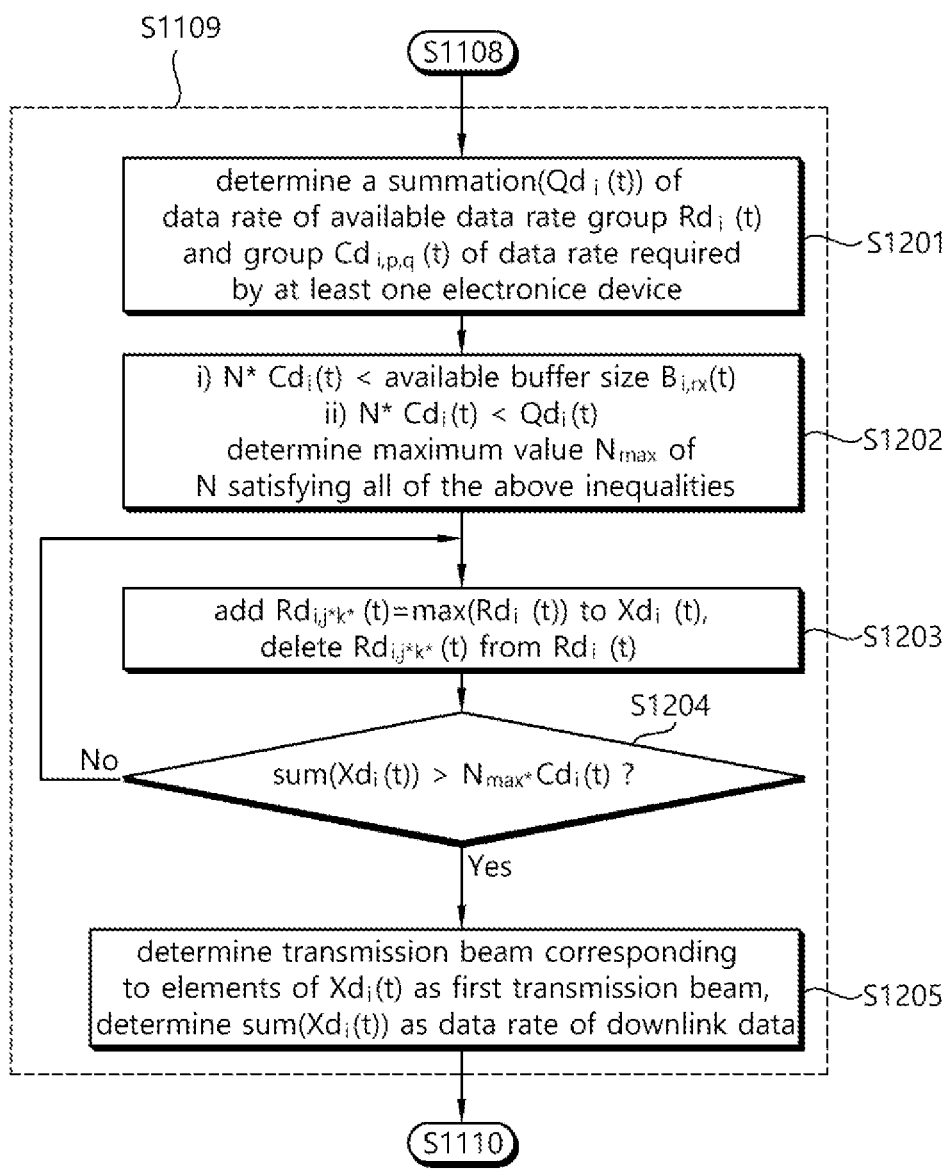

FIG. 12 is a flowchart illustrating an example of S1109 of FIG. 11a.

Referring to FIG. 12, in step S1201, the MEC server may determine the sum of data rates ($Cd_i(t)$) of the data rates $Cd_{i,p,q}(t)$ required by one or more electronic devices and the sum of the data rates ($Qd_i(t)$) of the available data rate group $Rd_i(t)$. The MEC server may consider $Rd_i(t)$ for both j=0 to j=jmax and k=0 to k=kmax.

Here, $Cd_i(t)$ may mean the sum of downlink data rates required by all electronic devices connected to TCU-i. MEC server may determine $Cd_i(t)$ as $Cd_i(t)=\Sigma_{p=0}^{p=pmax}\Sigma_{q=0}^{q=qmax}Cd_{i,p,q}(t)$.

MEC server may determine $Qd_i(t)$ as $Qd_i(t)=\Sigma_{j=0}^{j=jmax}\Sigma_{k=0}^{k=kmax}Rd_{i,j,k}(t)$.

In step S1202, the MEC server may determine the maximum value $N_{max}$ of N that satisfies both of the two inequalities (i) $N*Cd_i(t)<$TCUs available buffer size $B_{i,rx}(t)$ and ii) $N*Cdi(t)<Qdi(t)$. That is, the MEC server transmits downlink data using a data rate higher by N times the sum of the downlink data rates required by the TCU within the available buffer size of the TCU, thereby further securing the uplink transmission time of the TCU.

As another example, the MEC server may determine whether to perform step S1203 based on $N_{max}$, based on $T_{i,B\_Rx}$ and $T_{i,j^*,k^*}$. Here, $T_{i,j^*,k^*}$ means the time required for the MEC server to transmit the total size of downlink data requested by the TCU. In addition, $T_{i,j^*,k^*}$ may mean the time it takes for the cloud server related to the downlink data requested by the TCU to fill its buffer with all downlink data. $Fi(t)$ means the total size of data requested by the TCU. $T_{i,B\_Rx}$ means the time required for the TCU to fill the available buffer $B_{i,rx}(t)$. $T_{i,j^*,k^*}$ may be $T_{i,j^*,k^*}=F_i(t)/($min $(Rd_i,j^*,k^*(t), N*Cd_i(t)))$, $T_{i,B\_Rx}$ may be $T_{i,B\_Rx}=B_{i,Rx}(t)/($min $(Rd_i,j^*,k^*(t), N*Cd_i(t)))$.

For example, when the inequality $(T_{i,B\_Rx}>T_{i,j^*,k^*})$ is satisfied, the MEC server may perform step S1203. The case where the inequality $(T_{i,B\_Rx}>T_{i,j^*,k^*})$ is not satisfied is when $T_{i,j^*,k^*}$ is equal to or greater than the time($T_{i,B\_Rx}$) required for the TCU to fill the available buffer. If the inequality $(T_{i,B\_Rx}>T_{i,j^*,k^*})$ is not satisfied, the data flowing into the buffer in the cloud server may be stored in the TCU according to min($Rd_{i,j^*,k^*}(t)$, $N*Cd_i(t)$), which is the speed that the TCU can receive. In other words, the MEC server may receive the data flowing into the buffer in the cloud server, and the MEC server may transmit the received data to the TCU according to the transmission rate (min $(Rd_{i,j^*,k^*}(t), N^*Cd_i(t))$).

In step S1203, the MEC server may add $Rd_{i,j^*,k^*}(t) = \max(Rd_i(t))$ to $Xd_i(t)$, and may delete $Rd_{i,j^*,k^*}(t)$ from $Rd_i(t)$. Here, $Xd_i(t)$ may be a data rate group corresponding to a transmission beam to be used for downlink data transmission.

In step S1204, the MEC server may determine whether $sum(Xd_i(t)) > N_{max} * Cd_i(t)$ is satisfied. In other words, the MEC server may determine whether the sum of the data rates of all elements of $Xd_i(t)$ is greater than $N_{max}*Cd_i(t)$.

When $sum(Xd_i(t)) > N_{max} * Cd_i(t)$, the MEC server may perform step S1205. If it is not $sum(Xd_i(t)) > N_{max} * Cd_i(t)$, the MEC server may perform step S1203 again.

In step S1205, the MEC server may determine a transmission beam corresponding to the elements of $Xd_i(t)$ as the first transmission beam and determine $sum(Xd_i(t))$ as a data rate of downlink data. Alternatively, the MEC server may determine a transmission beam corresponding to an element having the highest data rate among elements of $Rd_i(t)$ (eg, a transmission beam having the highest data rate among transmission beams of the 5G transceiver (mmWave)) as the first transmission beam. Here, the first transmission beam means a transmission beam used for downlink data transmission.

Figure 13:
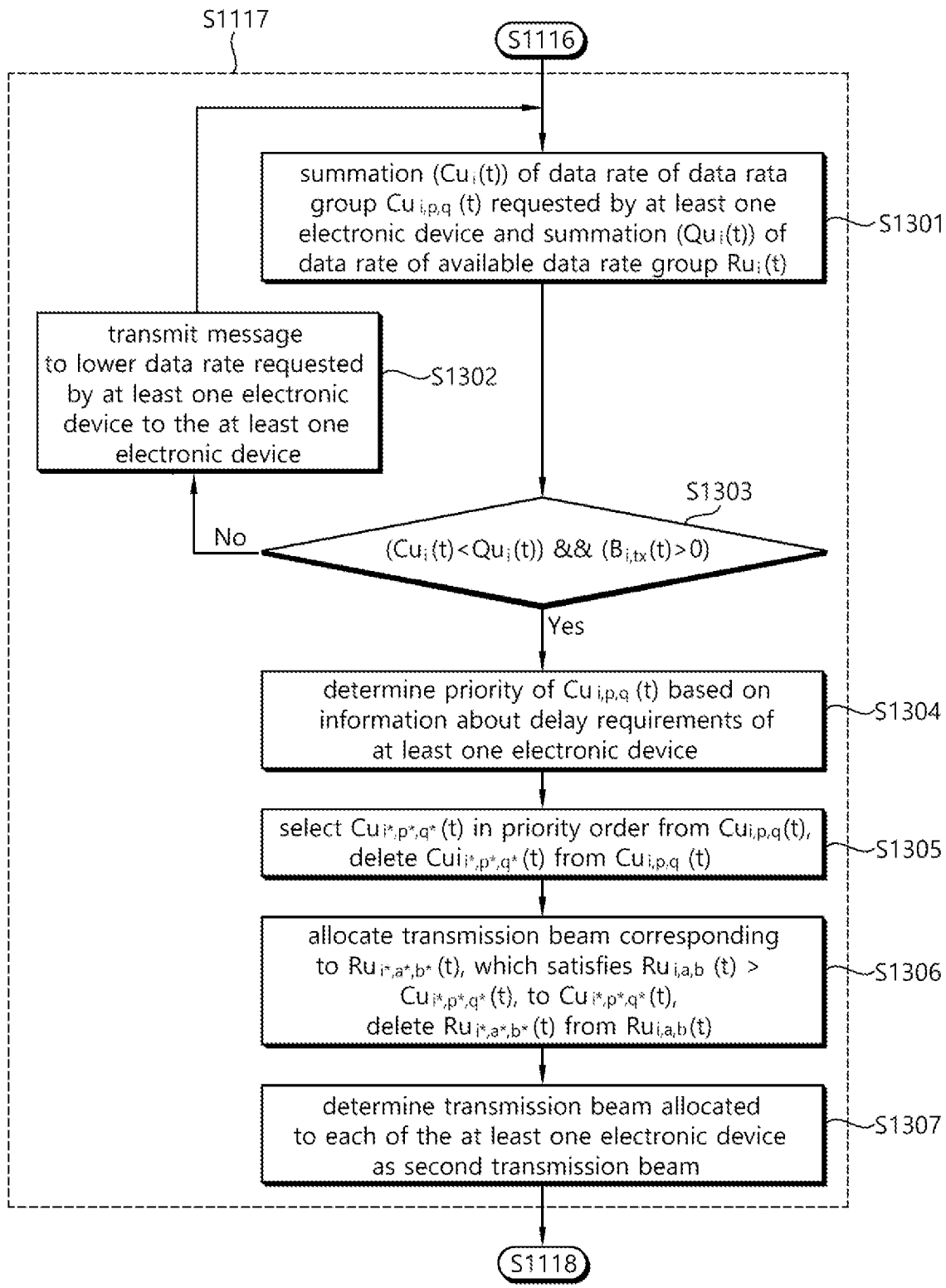
FIG. 13 is a flowchart illustrating an example of S1117 of FIG. 11b.

FIG. 13 is a flowchart illustrating an example of S1117 of FIG. 11b.

Referring to FIG. 13, in step S1301, the TCU may determine the sum ($Cu_i$ (t)) of data rates of the data rate group $Cu_{i,p,q}(t)$ required by one or more electronic devices and may determine the sum ($Qu_i(t)$) of the data rates of the available data rate group $Ru_i$ (t).

In step S1302, the TCU may determine whether all of the two inequalities $(Cu_i(t)+Qu_i(t))$ && $(B_{i,tx}(t)>0)$ are satisfied. If $(Cu_i(t)<Qu_i(t))$ && $(B_{i,tx}(t)>0)$, the TCU may perform step S1304. If it is not $(Cu_i(t)<Qu_i(t))$ && $(B_{i,tx}(t)>0)$, the TCU may perform step S1303.

In step S1303, the TCU may transmit a message to lower the data rate required by the one or more electronic devices to one or more electronic devices. For example, the TCU may send a message to lower the sampling rate to the lidar sensor, the radar sensor, and the camera.

In step S1304, the TCU may determine the priority of $Cu_{i,p,q}(t)$ based on information on delay requirements of one or more electronic devices. That is, the TCU may determine the priority based on the information on the uplink service requirement.

For example, the TCU may generate the following table related to data rate requirements and delay requirements among information on uplink service requirements.

TABLE 3

| data | data rate requirements | Delay Requirements $D_{i,p,q}(t)$ | Time remaining until timeout $(D_{i,p,q}(t) + t1 - T)$ | $1/(D_{i,p,q}(t) + t1 - T)$ |
|---|---|---|---|---|
| sensor data (e.g.: LiDAR sensor with p = 2, q = 1) | 1 Gbps | 5 msec | 1 msec | 10 |
| camera data (e.g.: camera data with p = 1, q = 3) | 1 Gbps | 10 msec | 1 msec | 10 |
| ECU execution result message (e.g. : ECU with p = 7, q = 5) | 1 Mbps | 2 msec | 0.2 msec | 5 |
| AVN data execution result (e.g.: AVN with p = 6, q = 2) | 1 Mbps | 100 msec | 2 msec | 5 |
| AVN Requests (e.g.: AVN with p = 6, q = 2) | 1 Mbps | 100 msec | 2 msec | 5 |
| RSE Multimedia execution Results (RSE with p = 5, q = 1) | 1 Mbps | 200 msec | 5 msec | 2 |
| Request message of wireless terminals (e.g.: wireless terminals with p = 4, q = 1 to 3) | 10 Mbps | 300 msec | 5 msec | 2 |

Here, $D_{i,p,q}(t)$ are delay requirements of each electronic device. Here, T means the current time. t1 means the arrival time of data. For example, t1 may be a time at which the TCU receives data related to uplink data (eg, an uplink data request message) from the MEC server. Alternatively, t1 may be a time at which the TCU previously received uplink data from the electronic device. Alternatively, t1 may be a time at which the TCU receives downlink data related to uplink data from the MEC server.

The TCU may determine $D_{i,p,q}(t)+t1-T$ or $1/(D_{i,p,q}(t)+t1-T)$ in Table 3 as the priority of the electronic device. For example, if $1/(D_{i,p,q}(t)+t1-T)$ is determined as the priority of the electronic device, the larger the value of $1/(D_{i,p,q}(t)+t1-T)$, the priority of electronic devices is higher. As another example, when $D_{i,p,q}(t)+t1-T$ is determined as the priority of the electronic device, the smaller the value of $D_{i,p,q}(t)+t1-T$ is, the priority of the electronic device is higher.

The TCU generates Table 3 at a specific time period (eg, time slot), and data once serviced can be excluded.

In step S1305, the TCU may select $Cu_{i^*,p^*,q^*}(t)$ in priority order from $Cu_{i,p,q}(t)$, and may delete $Cu_{i^*,p^*,q^*}(t)$ from $Cu_{i,p,q}(t)$.

In step S1306, the TCU may allocate a transmission beam corresponding to $Ru_{i^*,a^*,b^*}(t)$ that satisfies $Ru_{i,a,b}(t) > Cu_{i^*,p^*,q^*}(t)$ to $Cu_{i^*,p^*,q^*}(t)$, and may delete $Ru_{i^*,a^*,b^*}(t)$ from $Ru_{i,a,b}(t)$. For example, the TCU may determine a transmission beam corresponding to an element having the largest data rate among elements of $Ru_{i,a,b}(t)$ whose data rate is greater than $Cu_{i,p,q}(t)$ as a transmission beam of $Cu^*,p^*,q^*(t)$.

In step S1307, the TCU may determine a transmission beam allocated to each of the one or more electronic devices as the second transmission beam. For example, (eg, ECU with p=7, q=5) (eg, AVN with p=6, q=2) (eg, wireless terminals with p=4, q=1 to 3).

FIG. 14 and FIG. 15 show examples in which the TCU, the MEC server, and the mobile communication network perform downlink communication and uplink communication according to the contents described with reference to FIGS. 8 to 13.

FIG. 14 shows a first example of downlink communication and uplink communication of a TCU, an MEC server, and a mobile communication network according to the disclosure of the present specification. FIG. 15 shows a second example of downlink communication and uplink communication of a TCU, an MEC server, and a mobile communication network according to the disclosure of the present specification.

A period of T1+T2 may be the same as a safety message broadcasting period of a road side unit (RSU). However, this is only an example, and the period of T1+T2 may be independent of the safety message broadcasting period.

Referring to FIG. 14, downlink communication from the MEC server to the TCU and downlink communication from the TCU to the electronic device may be performed during the T1 period. In addition, uplink communication from the electronic device to the TCU and uplink communication from the TCU to the MEC server may be performed during the T2 period.

In FIG. 14, the TCU may transmit downlink data to an electronic device other than the ECU in downlink #1, and may transmit downlink data to the ECU in downlink #2. In addition, the ECU may transmit uplink data to the TCU in uplink #2 first, and an electronic device other than the ECU may transmit uplink data to the TCU in uplink #1.

Referring to FIG. 15, downlink communication from the MEC server to the TCU and downlink communication from the TCU to the electronic device may be performed during the T1 period. In addition, uplink communication from the electronic device to the TCU and uplink communication from the TCU to the MEC server may be performed during the T2 period.

In FIG. 15, the TCU may transmit downlink data to electronic devices such as RSE 1, RSE 2, AVN, RSE 3, wireless terminals 1 to 4, and ECU. In addition, electronic devices such as cameras 1 and 2 lidar sensors 1 and 2 radar sensors 1 and 2, wireless terminals 1 and 2, and ECU, etc, may transmit uplink data to the TCU. In addition, the TCU may preferentially transmit uplink data of a specific electronic device, such as cameras 1 and 2, lidar sensors 1 and 2, and ECU, etc, to the MEC server, and transmit uplink data of the remaining electronic devices to the MEC server.

The MEC server transmits a large amount of data in the downlink by using the transmission beam of the 5G base station (mmWave), thereby reducing the length of T1 compared to the conventional method. Accordingly, the length of T2 can be increased compared to the conventional method. Accordingly, the TCU may transmit camera data and sensor data at a high data rate during the increased uplink transmission time T2 of the camera data. Here, camera data can be received from 12 cameras (4 front, 4 rear, 2 side (left), and 2 side (right)), and the total data rate of raw data may be at least 12 Gbps. The sensor data may be received from the one or more lidar sensors and the one or more radar sensors, and a data rate of the raw data of the lidar sensor and the radar sensor may be at least 10 Gbps, respectively.

According to the content described in the disclosure of this specification, the MEC server may transmit data at a data rate higher than the downlink service request data rate within the available buffer range of the TCU. Then, the TCU may buffer high-capacity multimedia data, HD-MAP data, etc, and transmit the data to a plurality of electronic devices (eg, RSE, AVN, autodriving system computer (ADSC), ECU) connected to the TCU. In addition, the TCU may collect uplink data, an execution result of the electronic device, and a downlink service requirement from the electronic devices, and transmit it to the MEC server.

According to the content described in the disclosure of this specification, the MEC server may transmit a high-capacity data to the TCU in a short time by transmitting downlink data using a transmission beam of a 5G base station (mmWave).

According to the disclosure of the present specification, the MEC server can increase the uplink transmission time so that the TCU can transmit more uplink data by reducing the downlink transmission time to the TCU.

Accordingly, the TCU may transmit camera data and sensor data at a high data rate during the increased uplink transmission time. Here, camera data can be received from 12 cameras (4 front, 4 rear, 2 side (left), and 2 side (right)), and the total data rate of raw data may be at least 12 Gbps. The sensor data may be received from the one or more lidar sensors and the one or more radar sensors, and a data rate of the raw data of the lidar sensor and the radar sensor may be at least 10 Gbps, respectively.

If camera data and sensor data are transmitted at a higher data rate, more raw data can be transmitted. Then, the MEC server can effectively perform object detection based on the camera data and sensor data received at a high data rate. The MEC server may transmit control data to the TCU based on the effectively performed object detection result.

The TCU may buffer high-capacity downlink data and transmit the buffered downlink data to each electronic device according to a delay requirement of each electronic device. In addition, the TCU may transmit a large amount of camera data and sensor data to the MEC server by securing a high uplink data rate (eg, at least 12 Gbps or more).

Figure 16:
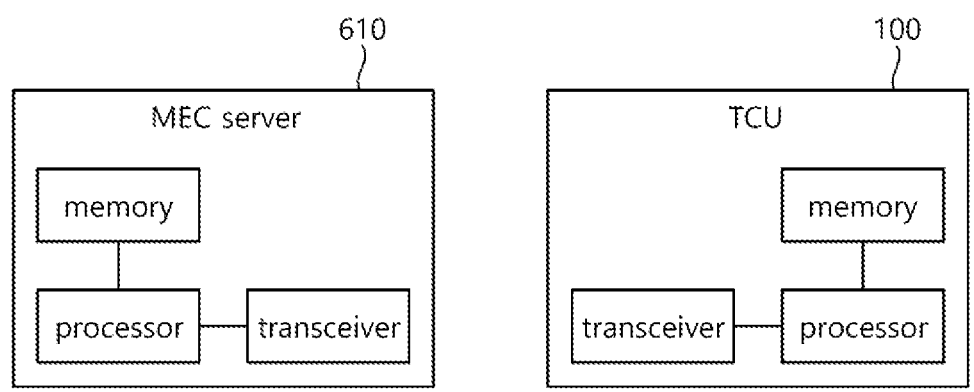
FIG. 16 is a configuration block diagram of an MEC server and a TCU according to an embodiment.

FIG. 16 is a configuration block diagram of an MEC server and a TCU according to an embodiment.

Referring to FIG. 16, the MEC server 610 and the TCU 100 may include a memory, a processor, and a transceiver, respectively.

The illustrated processor, memory, and transceiver may each be implemented as separate chips, or at least two or more blocks/functions may be implemented through one chip.

The transceiver includes a transmitter and a receiver. When a specific operation is performed, only one operation of the transmitter and the receiver may be performed, or both the operation of the transmitter and the receiver may be performed. The transceiver may include one or more antennas for transmitting and/or receiving radio signals. In addition, the transceiver may include an amplifier for amplifying a received signal and/or a transmission signal and a band-pass filter for transmitting on a specific frequency band.

As described above, the transceiver of the TCU includes a first 5G transceiver (ie, a modem/antenna using sub 6 GHz), a second 5G transceiver (ie, a modem/antenna using mmWave), an LTE transceiver (ie, modem/antenna using LTE).

The processor may implement the functions, processes and/or methods proposed in this specification. The processor may include an encoder and a decoder. For example, the processor may perform an operation according to the above description. Such processors may include application-specific integrated circuits (ASICs), other chipsets, logic circuits, data processing devices, and/or converters that convert between baseband signals and radio signals.

Memory may include read-only memory (ROM), random access memory (RAM), flash memory, memory cards, storage media, and/or other storage devices.

Figure 17:
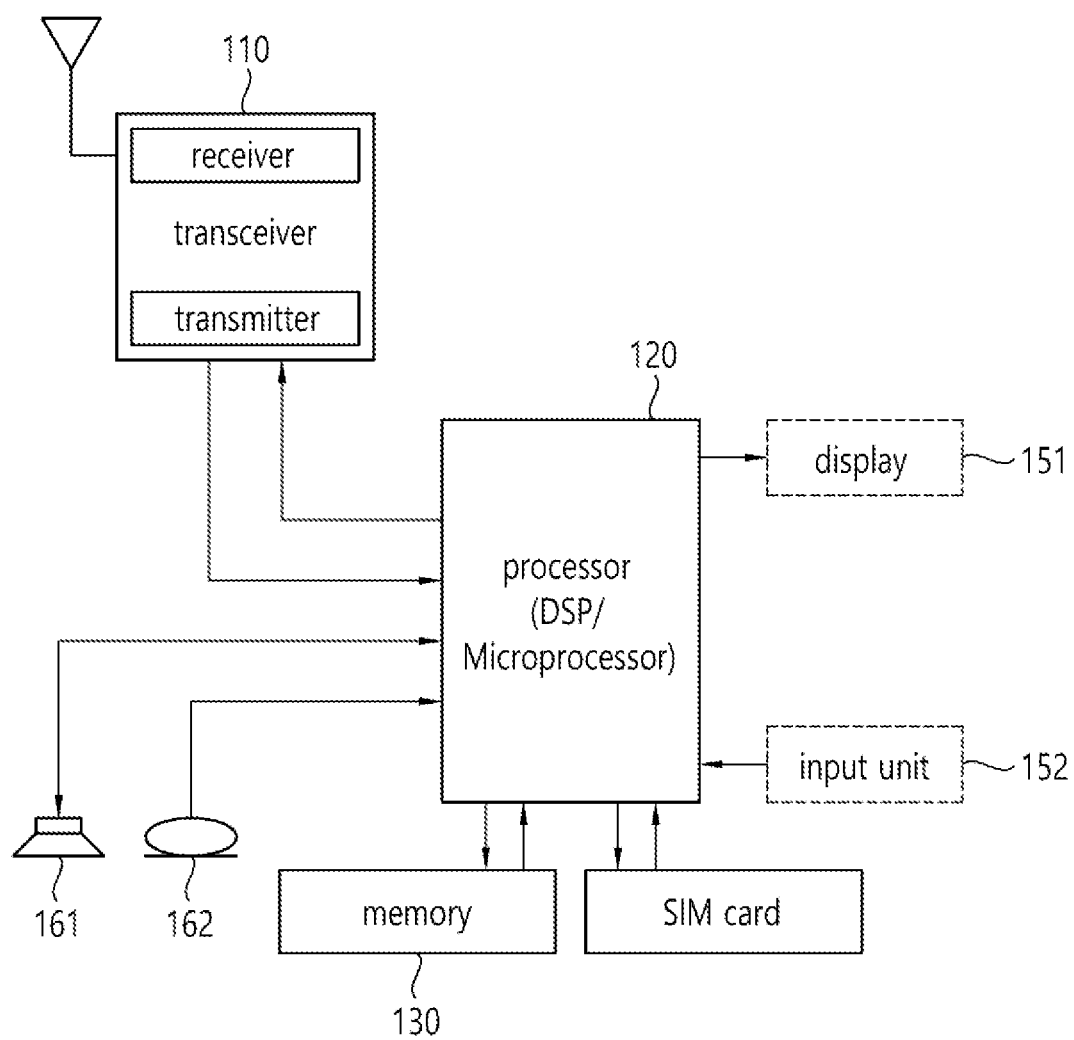
FIG. 17 is a block diagram illustrating in detail the configuration of a TCU according to an embodiment of the present disclosure.

FIG. 17 is a block diagram illustrating in detail the configuration of a TCU according to an embodiment of the present disclosure.

The illustrated TCU 100 includes a transceiver 110, a processor 120, a memory 130, one or more antennas, and a subscriber identification module (SIM) card.

The illustrated TCU 100 may further include a speaker 161 and a microphone 162 as necessary.

The illustrated TCU 100 may further include a display 151 and an input unit 152 as necessary.

The processor 120 may be configured to implement the proposed functions, procedures and/or methods described herein. The layers of the radio interface protocol may be implemented in the processor 120. The processor 120 may include an application-specific integrated circuit (ASIC), other chipsets, logic circuits, and/or data processing devices. The processor 102 may be an application processor (AP). The processor 120 may include at least one of a digital signal processor (DSP), a central processing unit (CPU), a graphics processing unit (GPU), and a modem (modulator and demodulator). Examples of processor 120 may be SNAPDRAGON™ series processors manufactured by Qualcomm®, EXYNOS™ series processors manufactured by Samsung®, A series processors manufactured by Apple®, HELIO™ series processors manufactured by MediaTek®, INTEL® It may be an ATOM™ series processor manufactured by the company or a corresponding next-generation processor.

The display 151 outputs the result processed by the processor 120. Input unit 152 receives input to be used by processor 120. The input unit 152 may be displayed on the display 151. A SIM card is an integrated circuit used to securely store an international mobile subscriber identity (IMSI) and its associated keys used to identify and authenticate subscribers in mobile phone devices such as mobile phones and computers. The SIM card may not be physically implemented, but may be implemented as a computer program and stored in the memory.

The memory 130 is operatively coupled to the processor 120 and stores various information for operating the processor 120. Memory 130 may include read-only memory (ROM), random access memory (RAM), flash memory, memory cards, storage media, and/or other storage devices. When the embodiment is implemented in software, the techniques described in this specification may be implemented in modules (eg, procedures, functions, etc.) that perform the functions described in this specification. Modules may be stored in memory 130 and executed by processor 120. The memory 130 may be implemented inside the processor 120. Alternatively, the memory 130 may be implemented outside the processor 120, and may be communicatively connected to the processor 120 through various means known in the art.

The transceiver 110 is operatively coupled to the processor 120 and transmits and/or receives a radio signal. The transceiver 110 includes a transmitter and a receiver. The transceiver 110 may include a baseband circuit for processing a radio frequency signal. The transceiver controls one or more antennas to transmit and/or receive radio signals.

The speaker 161 outputs sound related results processed by the processor 120. Microphone 162 receives sound related input to be used by processor 120.

In the above, preferred embodiments of the present disclosure have been exemplarily described, but the scope of the present disclosure is not limited only to such specific embodiments, and thus the present disclosure may be modified, changed, or improved in various forms within the spirit of the present disclosure and the scope described in the claims.

In the exemplary system described above, the methods are described on the basis of a flowchart as a series of steps or blocks, but the present disclosure is not limited to the order of steps, and some steps may occur in a different order or concurrently with other steps as described above. In addition, those skilled in the art will understand that the steps shown in the flowchart are not exhaustive and that other steps may be included or that one or more steps in the flowchart may be deleted without affecting the scope of the present disclosure.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A server for controlling a TCU (Telematics Communication Unit) mounted on a vehicle in the next-generation mobile communication system,
    a transceiver; and
    a processor for controlling the transceiver,
    wherein the processor is configured to perform operations comprising:
    determining a available data rate for a combination of a plurality of transmission beams of the base station and a plurality of receptions beams of the TCU, based on channel state information for a radio channel between the TCU and the base station;
    receiving information on the available buffer size of the TCU and information on downlink service requirements of one or more electronic devices in the vehicle from the TCU through the base station;
    determining a data rate of downlink data and a first transmission beam of the base station, based on information on the available buffer size of the TCU, information on downlink service requirements for the one or more electronic devices, and the available data rate; and
    transmitting the downlink data to the TCU through the base station, based on the determined data rate and the first transmission beam,
    wherein the information on the available buffer size of the TCU includes information on an available buffer size of the memory of the TCU and information on an available buffer size of at least one transceiver of the TCU, and
    wherein the information on the available buffer size of the TCU used in the process of determining the data rate and the first transmission beam is the smaller buffer size between the available buffer size of the memory of the TCU and the available buffer size of the at least one transceiver of the TCU.

2. The server of claim 1,
    wherein the information on the downlink service requirements includes information about data rate requirements and information about delay requirements.

3. The server of claim 1,
    wherein the data rate of the downlink data is determined as a value obtained by multiplying the first data rate required by the information on the downlink service requirement by N.

4. The server of claim 3,
wherein N is,
the N * the first data rate <the available buffer size of the TCU,
the maximum value among N values satisfying the inequality.

5. The server of claim 1,
the processor is further configure to perform:
receiving the channel state information from the TCU through the base station.

6. The server of claim 1,
wherein the base station includes a long term evolution (LTE) transceiver, a 5G transceiver, and a WiFi transceiver.

7. A TCU (Telematics Communication Unit) mounted on a vehicle,
a memory;
at least one transceiver; and
a processor for controlling the memory and the at least one transceiver,
wherein the processor is configured to perform operations comprising:
determining an available data rate for a combination of a plurality of reception beams of the base station and a plurality of transmission beams of each of the at least one transceiver, based on channel state information for a radio channel between the TCU and the base station process;
determining a first transmission beam of the at least one transceiver based on the information on the available buffer size of the TCU, information on uplink service requirements of one or more electronic devices in the vehicle, and the available data rate,
wherein the information on the uplink service requirements includes information about data rate requirements and information about delay requirements;
after receiving the uplink data from the one or more electronic devices, transmitting the uplink data to the server through the base station based on the first transmission beam; and
determining the priority of the first uplink data and the second uplink data based on the information on the delay requirements,
wherein the one or more electronic devices include a first electronic device and a second electronic device, and
wherein the uplink data includes first uplink data of the first electronic device and second uplink data of the second electronic device.

8. The TCU of claim 7,
wherein the processor is further configured to perform:
transmitting information on an available buffer size of the TCU and information on a downlink service requirement of the one or more electronic devices to a server through the base station.

9. The TCU of claim 7,
wherein the processor is further configured to perform:
receiving downlink data from the server through the base station; and
transmitting the received downlink data to the one or more electronic devices.

10. The TCU of claim 7,
wherein the information on the available buffer size of the TCU includes information on the available buffer size of the memory and information on the available buffer size of the at least one transceiver.

11. The TCU of claim 7, wherein the first transmission beam for each of the first uplink data and the second uplink data is determined in the order of the determined priority.

12. The TCU of claim 7,
wherein the processor is further configured to perform:
receiving the channel state information from the base station.

13. The method of claim 7,
wherein the at least one transceiver includes a long term evolution (LTE) transceiver, a 5G transceiver, and a WiFi transceiver.

* * * * *